United States Patent
Belleschi et al.

(10) Patent No.: US 10,785,606 B2
(45) Date of Patent: Sep. 22, 2020

(54) METHODS FOR HANDLING QUASI CO-LOCATION (QCL) CONFIGURATION FOR MULTICAST TRANSMISSIONS

(71) Applicant: Telefonaktiebolaget LM Ericsson (publ), Stockholm (SE)

(72) Inventors: Marco Belleschi, Solna (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 57 days.

(21) Appl. No.: 16/090,955

(22) PCT Filed: Apr. 11, 2017

(86) PCT No.: PCT/SE2017/050362
§ 371 (c)(1),
(2) Date: Oct. 3, 2018

(87) PCT Pub. No.: WO2017/180049
PCT Pub. Date: Oct. 19, 2017

(65) Prior Publication Data
US 2019/0116467 A1    Apr. 18, 2019

Related U.S. Application Data

(60) Provisional application No. 62/321,014, filed on Apr. 11, 2016.

(51) Int. Cl.
*H04L 12/801* (2013.01)
*H04L 5/14* (2006.01)
(Continued)

(52) U.S. Cl.
CPC .......... *H04W 4/06* (2013.01); *H04B 7/0626* (2013.01); *H04L 1/1819* (2013.01); *H04W 4/40* (2018.02); *H04W 4/70* (2018.02); *H04W 76/27* (2018.02)

(58) Field of Classification Search
CPC ......... H04W 4/06; H04W 76/27; H04W 4/40; H04W 4/70; H04L 1/1819; H04B 7/0626
See application file for complete search history.

(56) References Cited

U.S. PATENT DOCUMENTS

2008/0102749 A1* 5/2008 Becker ............... H04L 12/1877
455/3.06
2015/0304122 A1* 10/2015 Pazos .................. H04L 61/2069
370/312
(Continued)

OTHER PUBLICATIONS

ETSI TS 136 213 v11.5.0; Technical Specification; LTE; Evolved Universal Terrestrial Radio Access (E-UTRA); Physical layer procedures (3GPP TS 36.213 version 11,5,0 Release 11)—Jan. 2014.
(Continued)

*Primary Examiner* — Brian S Roberts
*Assistant Examiner* — Abusayeed M Haque
(74) *Attorney, Agent, or Firm* — Baker Botts, LLP

(57) ABSTRACT

In certain embodiments, a method for use in a network node comprises sending a control information message to at least one wireless device that is in idle mode. The message comprises a mapping that maps a quasi co-location (QCL) assumption to a multicast transmission or multicast channel. For example, in certain embodiments, the multicast transmission or multicast channel is associated with a temporary multicast group indicator (TMGI), and the mapping maps the QCL assumption to the TMGI. The control information message causes the at least one wireless device to use the QCL assumption to decode the multicast transmission or multicast channel while in idle mode.

31 Claims, 16 Drawing Sheets

(51) Int. Cl.
*H04L 12/28* (2006.01)
*H04L 29/06* (2006.01)
*H04W 4/06* (2009.01)
*H04W 4/70* (2018.01)
*H04W 4/40* (2018.01)
*H04W 76/27* (2018.01)
*H04B 7/06* (2006.01)
*H04L 1/18* (2006.01)

(56) References Cited

U.S. PATENT DOCUMENTS

| | | | |
|---|---|---|---|
| 2016/0007170 A1 | 1/2016 | Vaidya et al. | |
| 2016/0014778 A1* | 1/2016 | Zhou | H04L 5/0053 370/252 |
| 2016/0080963 A1* | 3/2016 | Marinier | H04L 5/0082 370/252 |
| 2016/0135143 A1* | 5/2016 | Won | H04W 4/06 370/312 |
| 2016/0262161 A1* | 9/2016 | Li | H04L 5/0051 |
| 2018/0198495 A1* | 7/2018 | Davydov | H04J 13/004 |

OTHER PUBLICATIONS

Section 7.1.9 PDSCH Resource Mapping Parameters; ETSI TS 136 213 14.2.0; LTE: Evolved Universal Terrestrial Radio Access (E-UTRA); Physical layer procedures—Apr. 2017.
Section 6.4 Physical Downlink Shared Channel; ETSI TS 136 211 v13.1.0; LTE; Evolved Universal Terrestrial Radio Access (E-UTRA); Physical channels and modulation—Apr. 2016.
PCT International Search Report for International application No. PCT/SE2017/050362—Jul. 17, 2017.
PCT Written Opinion of the International Searching Authority for International application No. PCT/SE2017/050362—Jul. 17, 2017.
Communication Pursuant to 94(3) EPC issued for Application No. 17 719 944.5-1218—Feb. 21, 2020.

* cited by examiner

METHODS FOR HANDLING QUASI CO-LOCATION (QCL) CONFIGURATION FOR MULTICAST TRANSMISSIONS

PRIORITY

This nonprovisional application is a U.S. National Stage Filing under 35 U.S.C. § 371 of International Patent Application Serial No. PCT/SE2017/050362 filed Apr. 11, 2017, and entitled "METHODS FOR HANDLING QUASI CO-LOCATION (QCL) CONFIGURATION FOR MULTICAST TRANSMISSIONS" which claims priority to U.S. Provisional Patent Application No. 62/321,014 filed Apr. 11, 2016, both of which are hereby incorporated by reference in their entirety.

TECHNICAL FIELD

Certain embodiments of the present disclosure relate, in general, to wireless communications and, more particularly, to handling quasi co-location (QCL) configuration for multicast transmissions. Certain embodiments may be relevant to Hybrid Automatic Repeat Request (HARD) retransmission, Multimedia Broadcast/Multicast Service (MBMS), Vehicle-to-X (V2X) communications, Physical Uplink Control Channel (PUCCH), Single-Cell Point to Multipoint (SC-PTM), MBMS Single-Frequency Network (MBSFN), QCL, transmission modes (TM), and/or other suitable aspects of wireless communication.

BACKGROUND

Introduction to LTE ProSe applications and V2X During Release 12, the LTE standard has been extended with support of device to device (D2D) (specified as "sidelink") features targeting both commercial and Public Safety applications. Some applications enabled by Rel-12 LTE are device discovery, where devices are able to establish communication with another device in the proximity and associated application by broadcasting and detecting discovery messages that carry device and application identities. Another application consists of direct communication based on physical channels terminated directly between devices. In 3GPP, all of these applications are defined under the umbrella of Proximity Services (ProSe).

One of the potential extensions of the ProSe framework consists of support of V2x communication, which includes any combination of direct communication between vehicles, pedestrians and infrastructure. V2x communication may take advantage of a NW infrastructure, when available, but at least basic V2x connectivity should be possible even in case of lack of coverage. Providing an LTE-based V2x interface may be economically advantageous because of the LTE economies of scale and it may enable tighter integration between communications with the NW infrastructure (V2I) and V2P and V2V communications, as compared to using a dedicated V2x technology.

There are many research projects and field tests of connected vehicles in various countries or regions, including projects that are based on the use of existing cellular infrastructure.

V2x communications may carry both non-safety and safety information, where each of the applications and services may be associated with specific requirements sets, e.g., in terms of latency, reliability, capacity, etc. FIG. 1 illustrates types of V2X communications from the application point of view (e.g., V2V, V2I, V2P, and V2N). These types of communication/services are further described below.

V2V (vehicle to vehicle): Covers communication between vehicles using V2V applications and is predominantly broadcast-based. V2V may be realized by either direct communication between the devices in the respective vehicles, or via infrastructure such as a cellular network. An example of V2V is the transmission of a cooperative awareness message (CAM) with vehicle status information (such as position, direction and speed) transmitted to other vehicles in the proximity repeatedly (every 100 ms-1 s). Another example is the transmission of a decentralized environmental notification message (DENM), which is an event-triggered message to alert vehicles. These two examples are taken from the ETSI Intelligent Transport Systems (ITS) specification of V2X applications, see also 2.1.2, which also specifies the conditions under which the messages are generated. Main characteristic of V2V applications is the tight requirements on latency that can vary from 20 ms (for pre-crash warning messages) to 100 ms for other road safety services.

V2I (vehicle to infrastructure): This comprises communication between vehicles and a Roadside Unit (RSU). The RSU is a stationary transportation infrastructure entity which communicates with vehicles in its proximity. An example of V2I is transmission of speed notifications from the RSU to vehicles, as well as queue information, collision risk alerts, curve speed warnings. Due to the safety related nature of V2I, delay requirements are similar to V2V requirements.

V2P (vehicle to pedestrian): Covers communication between vehicles and vulnerable road users, such as pedestrians, using V2P applications. V2P typically takes place between distinct vehicles and pedestrians either directly or via infrastructure such as cellular network.

V2N (vehicle to network): Covers communication between a vehicle and a centralized application server (or an ITS Traffic Management Center) both using V2N applications, via infrastructure (such as a cellular network). One example is a bad road condition warning sent to all vehicles in a wide area, or traffic flow optimization in which V2N application suggests speeds to vehicles and coordinates traffic lights. Therefore, V2N messages are supposed to be controlled by a centralized entity (i.e. the Traffic Management Center) and provisioned to vehicles in a large geographical area, rather than in a small area. Additionally, unlike V2V/V2I, latency requirements are more relaxed in V2N because it is not meant to be used for non-safety purposes, e.g. is latency requirement is typically considered.

Multimedia Broadcast/Multicast Service in E-UTRAN

The Multimedia Broadcast/Multicast Service (MBMS) aims to provide an efficient mode of delivery for both broadcast and multicast services over the core network. MBMS was introduced in the second release of the LTE specifications (Release 9), although the initial Release 8 physical layer specifications were already designed to support MBMS by including essential components to ensure forward-compatibility.

The LTE MBMS feature is largely based on that which was already available in UTRAN (from Release 6) and GERAN with both simplifications and enhancements. In the most general sense, broadcasting is the distribution of content to an audience of multiple users; in the case of mobile multimedia services an efficient transmission system for the simultaneous delivery of content to large groups of mobile users. Typical broadcast content can include newscasts, weather forecasts or live mobile television, now extended into LTE E-UTRAN system.

FIG. 2 illustrates an example of a network architecture for Group Communication System Enabler (GCSE) in a roaming scenario. As shown in FIG. 2, MBMS is a key component to enable group communication (e.g., GCSE), where the key network entity includes the server of GCS, where the traffic goes towards BM-SC (Broadcast-Multicast Service Centre), to MBMS GW (MBMS Gateway) to E-UTRAN to UE. Please note that here the service can be provided by either unicast or multi-cast in a flexible way, decided by application server GCS AS (where the unicast bearer is routed back to P-GW of H-PLMN in FIG. 2). Group communication is for instance the base of Mission Critical Push-To-Talk (MCPTT) applications where mission critical group of users (e.g. police, ambulance, rescue teams, etc.) can reach in a large area a large number of other users belonging to the same group.

From RAN perspective, MBMS transmissions can be realized with two different techniques:

MBSFN where the same content of an MBMS bearer (which corresponds to a specific service identified with the temporary multicast group indicator (TMGI)) is transmitted from different cells belonging to the same MBMS area which can span a very large area. The transmissions from the different cell are time-synchronized so that the resulting signal will, from a terminal point of view, appear as a transmission from a single cell. In order to realize such combining gain at the UE, all the cells joining the same MBMS session should coordinate their scheduling decisions. In MBSFN the scheduler is not located in the eNB, but in the MCE node which can coordinate scheduling allocations for multiple eNBs. MBSFN transmissions occur over a dedicated multicast transport channel (MCH) over which both control signaling (MCCH) and data (MTCH) are multiplexed. There is one-to-one association between MTCH and TMGI.

SC-PTM where multicasting of MBMS data is not executed simultaneously from multiple cells as in MBSFN, but it is limited to a single cell area. Multicast transmissions (both control signaling and data) are sent over PDSCH and scheduled by the eNB. There is one-to-one association between SC-MTCH and TMGI.

The MBMS framework does not consider the possibility to have retransmissions at lower layers, i.e., no HARQ retransmissions and only RLC UM applies.

Since V2X is predominantly a broadcast service, MBMS is an appealing technique to distribute V2X messages in a certain area to a possible large number of UEs.

Hybrid Automatic Repeat Request (HARQ)

Hybrid Automatic Repeat Request (HARQ) is a mechanism used in LTE to handle retransmission of missing or erroneous transmitted packets. The HARQ procedure consists in providing feedbacks (ACK/NACK) to the transmitter on a transport block basis thereby offering the possibility to successfully decode a transport block very quickly. The probability to eventually decode with success a given packet is enforced by the soft combining technique that enforces the HARQ operation. In particular, a receiver implementing the soft combining scheme stores the erroneously received packet and later combines it with the retransmitted replicas of that packet requested by the HARQ feedback. Such replicas contain the same data as the original transport block but a different set of coded bits obtained with different redundancy versions, i.e. by using a different puncturing pattern of the code.

In legacy LTE, the uplink HARQ feedbacks (ACK/NACK) are conveyed by the Physical Hybrid-ARQ Indicator Channel (PHICH) channel that is transmitted by the eNB upon detection of an uplink transmission on the Physical Uplink Shared Channel (PUSCH) by the UE.

In legacy LTE, the downlink HARQ feedbacks (ACK/NACK) are conveyed by the Physical Uplink Control Channel (PUCCH) that is transmitted by the UE upon detection of a downlink transmission on the Physical Downlink Shared Channel (PDSCH) by the eNB.

PUCCH Format in LTE

In LTE Rel-8, PUCCH format 1/1a/1b and PUCCH format 2/2a/2b are supported for SR, HARQ-ACK and periodic CSI reporting. The PUCCH resource is represented by a single scalar index, from which the phase rotation and the orthogonal cover sequence (only for PUCCH format 1/1a/1b) are derived. The use of a phase rotation of a cell-specific sequence together with orthogonal sequences provides orthogonally between different terminals in the same cell transmitting PUCCH on the same set of resource blocks.

In LTE Rel-10, PUCCH format 3 was introduced for carrier aggregation for FDD and TDD, when there are multiple downlink transmissions, (either on multiple carriers or multiple downlink subframes) but single uplink (either single carrier or single uplink subframe) for HARQ-ACK, SR and CSI feedback. Similarly, the PUCCH format 3 resource is also represented by a single scalar index from which the orthogonal sequence and the resource-block number can be derived. A length-5 orthogonal sequence is applied for PUCCH format 3 to support code multiplexing within one resource-block pair and a length-4 orthogonal sequence is applied for shorted PUCCH. The PUCCH format 3 resource is determined according to higher layer configuration and a dynamic indication from the downlink assignment. In detail, the TPC field in the DCI format of the corresponding PDCCH/EPDCCH is used to determine the PUCCH resource values from one of the four resource values configured by higher layers. For FDD, the TPC field corresponds to the PDCCH/EPDCCH for the scheduled secondary serving cells. For TDD, the TPC field corresponds to the PDCCH/EPDCCH for the primary cell with DAI value in the PDCCH/EPDCCH larger than '1'. A UE shall assume that the same PUCCH resource values are transmitted in each DCI format of the corresponding PDCCH/EPDCCH assignments.

In 3GPP up to Rel-12, the maximum downlink component carriers are 5. For HARQ-ACK feedback, PUCCH format 1b with channel selection and PUCCH format 3 have enough capability to feedback the HARQ-ACK for all configured carriers. However, in Rel-13, maximum 32 downlink carriers can be configured for one UE and hence at least one new PUCCH format will be introduced to carry more HARQ-ACK bits due to the aggregation of 32 DL CCs.

Quasi Co-Location (QCL)

According to the LTE terminology, it is said that two antenna ports are quasi co-located (QCL) with respect to a certain channel property X when such channel property X may be assumed to be the same for both ports by the UE. Conversely, it is said that two antenna ports are not quasi co-located (QCL) with respect to a certain channel property X when such channel property X shall not be assumed to be the same for both ports by the UE. UEs may exploit knowledge of the QCL assumptions in a number of ways. For example, the complexity of channel estimation algorithms may be reduced by avoiding individual estimation of channel properties that are quasi co-located between different antenna ports. Another advantage is the possibility of extracting channel properties from certain ports which allow accurate estimation and applying them to other quasi co-located ports that do not allow equally good estimation. An example of QCL is described in the 3GPP TS 36.213 specification.

PDSCH Resource Mapping Parameters

A UE configured in transmission mode 10 for a given serving cell can be configured with up to 4 parameter sets by higher layer signaling to decode PDSCH according to a detected PDCCH/EPDCCH with DCI format 2D intended for the UE and the given serving cell. The UE shall use the parameter set according to the value of the 'PDSCH RE Mapping and Quasi-Co-Location indicator' field (mapping defined in Table 7.1.9-1) in the detected PDCCH/EPDCCH with DCI format 2D for determining the PDSCH RE mapping (defined in subclause 6.4 of [3]), and for determining PDSCH antenna port quasi co-location (defined in subclause 7.1.10) if the UE is configured with Type B quasi co-location type (defined in subclause 7.1.10). For PDSCH without a corresponding PDCCH/EPDCCH, the UE shall use the parameter set indicated in the PDCCH/EPDCCH with DCI format 2D corresponding to the associated SPS activation for determining the PDSCH RE mapping (defined in subclause 6.4 of [3]) and PDSCH antenna port quasi co-location (defined in subclause 7.1.10).

TABLE 7.1.9-1

PDSCH RE Mapping and Quasi-Co-Location Indicator field in DCI format 2D

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The following parameters for determining PDSCH RE mapping and PDSCH antenna port quasi co-location are configured via higher layer signaling for each parameter set:
crs-PortsCount-r11.
crs-FreqShift-r11.
mbsfn-SubframeConfigList-r11.
csi-RS-ConfigZPId-r11.
pdsch-Start-r11.
qcl-CSI-RS-ConfigNZPId-r11.

To decode PDSCH according to a detected PDCCH/EPDCCH with DCI format 1A with CRC scrambled with C-RNTI intended for the UE and the given serving cell and for PDSCH transmission on antenna port 7, a UE configured in transmission mode 10 for a given serving cell shall use the parameter set 1 in table 7.1.9-1 for determining the PDSCH RE mapping (defined in subclause 6.4 of [3]), and for determining PDSCH antenna port quasi co-location (defined in subclause 7.1.10) if the UE is configured with Type B quasi co-location type (defined in subclause 7.1.10).

To decode PDSCH corresponding to detected PDCCH/EPDCCH with DCI format 1A with CRC scrambled with SPS C-RNTI and PDSCH without a corresponding PDCCH/EPDCCH associated with SPS activation indicated in PDCCH/EPDCCH with DCI format 1A, a UE configured in transmission mode 10 for a given serving cell shall use the parameter set 1 in table 7.1.9-1 for determining the PDSCH RE mapping (defined in subclause 6.4 of [3]), and for determining PDSCH antenna port quasi co-location (defined in subclause 7.1.10) if the UE is configured with Type B quasi co-location type (defined in subclause 7.1.10).

To decode PDSCH according to a detected PDCCH/EPDCCH with DCI format 1A intended for the UE on a given serving cell and for PDSCH transmission on antenna port 0-3, a UE configured in transmission mode 10 for the given serving cell shall determine the PDSCH RE mapping (as described in subclause 6.4 of [3]) using the lowest indexed zero-power CSI-RS resource.

Antenna Ports Quasi Co-Location for PDSCH (Subclause 7.1.10)

A UE configured in transmission mode 8-10 for a serving cell may assume the antenna ports 7-14 of the serving cell are quasi co-located (as defined in [3]) for a given subframe with respect to delay spread, Doppler spread, Doppler shift, average gain, and average delay.

A UE configured in transmission mode 1-9 for a serving cell may assume the antenna ports 0-3, 5, 7-22 of the serving cell are quasi co-located (as defined in [3]) with respect to Doppler shift, Doppler spread, average delay, and delay spread.

A UE configured in transmission mode 10 for a serving cell is configured with one of two quasi co-location types for the serving cell by higher layer parameter qcl-Operation to decode PDSCH according to transmission scheme associated with antenna ports 7-14: Type A: The UE may assume the antenna ports 0-3, 7-22 of a serving cell are quasi co-located (as defined in [3]) with respect to delay spread, Doppler spread, Doppler shift, and average delay.

Type B: The UE may assume the antenna ports 15-22 corresponding to the CSI-RS resource configuration identified by the higher layer parameter qcl-CSI-RS-ConfigNZ-PId-r11 (defined in subclause 7.1.9) and the antenna ports 7-14 associated with the PDSCH are quasi co-located (as defined in [3]) with respect to Doppler shift, Doppler spread, average delay, and delay spread.

SUMMARY

In order to correctly decode signals transmitted using a demodulation reference signals (DMRS) based transmission mode (e.g., LTE TM10), the receiver needs to be aware of the QCL assumptions for the associated channel. This can be done as part of an RRC reconfiguration of the UE. However, in general, this is not possible in the case of multicast because the UE may be in RRC IDLE. Certain embodiments of the present disclosure may provide a solution to this and other problems.

Certain embodiments of the present disclosure provide methods for signaling QCL assumption to be used by the UE when operating in RRC IDLE mode. The solution takes advantage of broadcast system control information. The QCL assumptions may be associated to specific broadcast bearers in order to allow flexibility in the network (NW) configuration.

Certain embodiments of the present disclosure provide ways to enable overriding the broadcasted control information for individual UEs by requesting such UEs to go to RRC CONNECTED and then by overriding the broadcasted configuration for such UEs.

According to certain embodiments, a method for use in a network node comprises sending a control information message to at least one wireless device that is in idle mode. The message comprises a mapping that maps a QCL assumption to a multicast transmission or multicast channel.

According to certain embodiments, a network node comprises memory operable to store instructions and processing circuitry operable to execute the instructions whereby the network node is operable to send a control information message to at least one wireless device that is in idle mode. The message comprises a mapping that maps a QCL assumption to a multicast transmission or multicast channel.

According to certain embodiments, a computer program product comprises a non-transitory computer readable medium storing computer readable program code. The computer readable program code comprises program code for sending a control information message to at least one wireless device that is in idle mode. The message comprises a mapping that maps a QCL assumption to a multicast transmission or multicast channel.

In further embodiments of the method, the network node, and/or the computer program product, the multicast transmission or multicast channel is associated with a temporary multicast group indicator (TMGI) and the mapping maps the QCL assumption to the TMGI. In some embodiments, the control information message further comprises information regarding which transmission mode (TM) a receiver of the wireless device should assume for the multicast transmission or multicast channel associated with the TMGI.

In further embodiments of the method, the network node, and/or the computer program product, signaling is received from the wireless device indicating that the wireless device is unable to receive the TMGI. In response, the method/network node/computer program product determines a way of delivering content to the wireless device other than using the TMGI that the wireless device is unable to receive. As an example, a unicast bearer can be configured for serving the wireless device. As another example, the multicast transmission or multicast channel associated with the TMGI can be reconfigured such that the multicast transmission or multicast channel configuration is supported by the wireless device.

Further embodiments of the method, the network node, and/or the computer program product, involve determining to reconfigure the QCL assumption of the multicast transmission or multicast channel associated with the TMGI at least with respect to the wireless device. An indication is communicated to the wireless. The indication indicates that the wireless device receiving the multicast transmission or multicast channel associated with a TMGI of interest should transition from idle mode to connected mode. For example, the indication can be an explicit request to transition to connected mode or an implicit request that is made by requesting to obtain Hybrid Automatic Repeat Request (HARM) feedback, Channel State Information (CSI), and/or other measurements that the wireless device is configured to communicate while in connected mode. The QCL assumption is reconfigured while the wireless device is in connected mode such that, with respect to the wireless device, the reconfigured QCL assumption overrides the previous QCL assumption. In certain embodiments, the QCL assumption is not reconfigured for other wireless devices that remain in idle mode.

In certain embodiments, the multicast transmission or multicast channel is associated with a Multimedia Broadcast/Multicast Service (MBMS) bearer and the mapping maps the QCL assumption to the MBMS bearer.

In certain embodiments, the method/network node/computer program product generates the mapping prior to sending the mapping to the wireless device. In certain embodiments, the control information message is sent in a Master Information Block (MIB) and/or a System Information Block (SIB). In certain embodiments, the QCL assumption indicates whether the wireless device should assume fully collocated behavior or a flexible quasi co-location configuration. In certain embodiments, the QCL assumption comprises a default QCL configuration to be used by the wireless devices when receiving the multicast transmission or multicast channel. In certain embodiments, sending the control information message causes the at least one wireless device to use the QCL assumption to decode the multicast transmission or multicast channel while in idle mode.

According to certain embodiments, a method for use in a wireless device comprises receiving a control information message while in idle mode. The control information message is received from a network node, and the message comprises a mapping that maps a quasi co-location (QCL) assumption to a multicast transmission or multicast channel. The method comprises using the received QCL assumption to decode the multicast transmission or multicast channel while in idle mode if the wireless device supports the mapping.

According to certain embodiments, a wireless device comprises memory operable to store instructions and processing circuitry operable to execute the instructions whereby the wireless device is operable to receive a control information message while in idle mode. The control information message is received from a network node and comprises a mapping that maps a quasi co-location (QCL) assumption to a multicast transmission or multicast channel. The wireless device is operable to use the received QCL assumption to decode the multicast transmission or multicast channel while in idle mode if the wireless device supports the mapping.

According to certain embodiments, a computer program product comprises a non-transitory computer readable medium storing computer readable program code. The computer readable program code comprises program code for receiving a control information message from a network node while in idle mode. The control information message comprises a mapping that maps a quasi co-location (QCL) assumption to a multicast transmission or multicast channel. The computer readable program code further comprises program code for using the received QCL assumption to decode the multicast transmission or multicast channel while in idle mode if the mapping is supported.

In further embodiments of the method, the wireless device, and/or the computer program product, the multicast transmission or multicast channel is associated with a temporary multicast group indicator (TMGI) and the mapping maps the QCL assumption to the TMGI. In some embodiments, the control information message further comprises information regarding which transmission mode (TM) a receiver of the wireless device should assume for the multicast transmission or multicast channel associated with the TMGI.

In further embodiments of the method, the wireless device, and/or the computer program product, a determination is made that the wireless device is unable to receive the multicast transmission or multicast channel associated with the TMGI. The determination is based on comparing the QCL assumption associated with the TMGI to the capabilities of the wireless device. Signaling is sent to the network node indicating that the wireless device is unable to receive the multicast transmission or multicast channel associated with a TMGI of interest so that content from the network node is received according to a technique that does not require the use of the TMGI that the wireless device is unable to receive. As an example, the content is received via a unicast bearer that the network node configures for the wireless device. As another example, the multicast transmission or multicast channel associated with the TMGI is reconfigured to use a configuration that is supported by the wireless device and the content is received via the reconfigured multicast transmission or multicast channel.

In further embodiments of the method, the wireless device, and/or computer program product, an indication is received to transition from idle mode to connected mode. While in connected mode, a reconfigured QCL assumption associated with the TMGI is received, and the previous QCL assumption is overridden with the reconfigured QCL assumption. The indication to transition from idle mode to connected mode can comprise an explicit request to transition to connected mode or an implicit indication based on receiving a request to obtain Hybrid Automatic Repeat Request (HARM) feedback, Channel State Information (CSI), and/or other measurements that the wireless device is configured to communicate while in connected mode.

In certain embodiments, the multicast transmission or multicast channel is associated with a Multimedia Broadcast/Multicast Service (MBMS) bearer and the mapping maps the QCL assumption to the MBMS bearer.

In certain embodiments, the control information message is sent in a Master Information Block (MIB) and/or a System Information Block (SIB).

In certain embodiments, the QCL assumption indicates whether the wireless device should assume fully collocated behavior or a flexible quasi co-location configuration.

In certain embodiments, the method/wireless device/computer program product determines that the wireless device does not support the mapping and, in response, does not configure the receiver of the wireless device according to the received mapping.

In certain embodiments, the method/wireless device/computer program product configures the receiver according to the received mapping in response to a determination to use a TMGI associated with the multicast transmission or multicast channel indicated by the mapping.

In certain embodiments, the QCL assumption comprises a default QCL configuration to be used by the wireless devices when receiving the multicast transmission or multicast channel.

Certain embodiments of the present disclosure may provide one or more technical advantages. For example, certain embodiments enable the flexible use of DMRS-based TM for multicast even by IDLE UEs. Other advantages may be readily apparent to one having skill in the art. Certain embodiments may have none, some, or all of the recited advantages.

BRIEF DESCRIPTION

DETAILED DESCRIPTION

Figure 1:
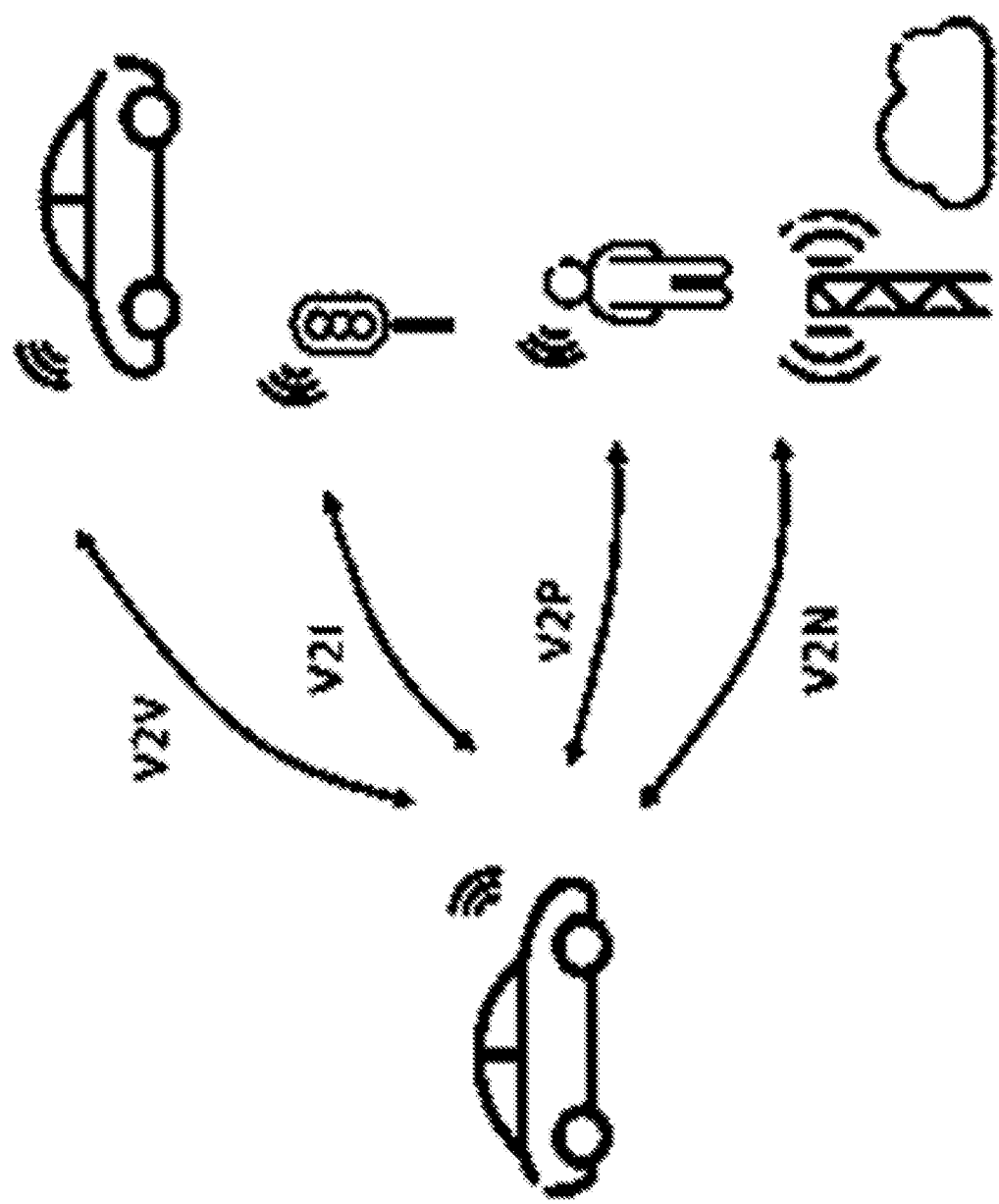
FIG. 1 illustrates examples of types of vehicle-to-X communications.
Figure 2:
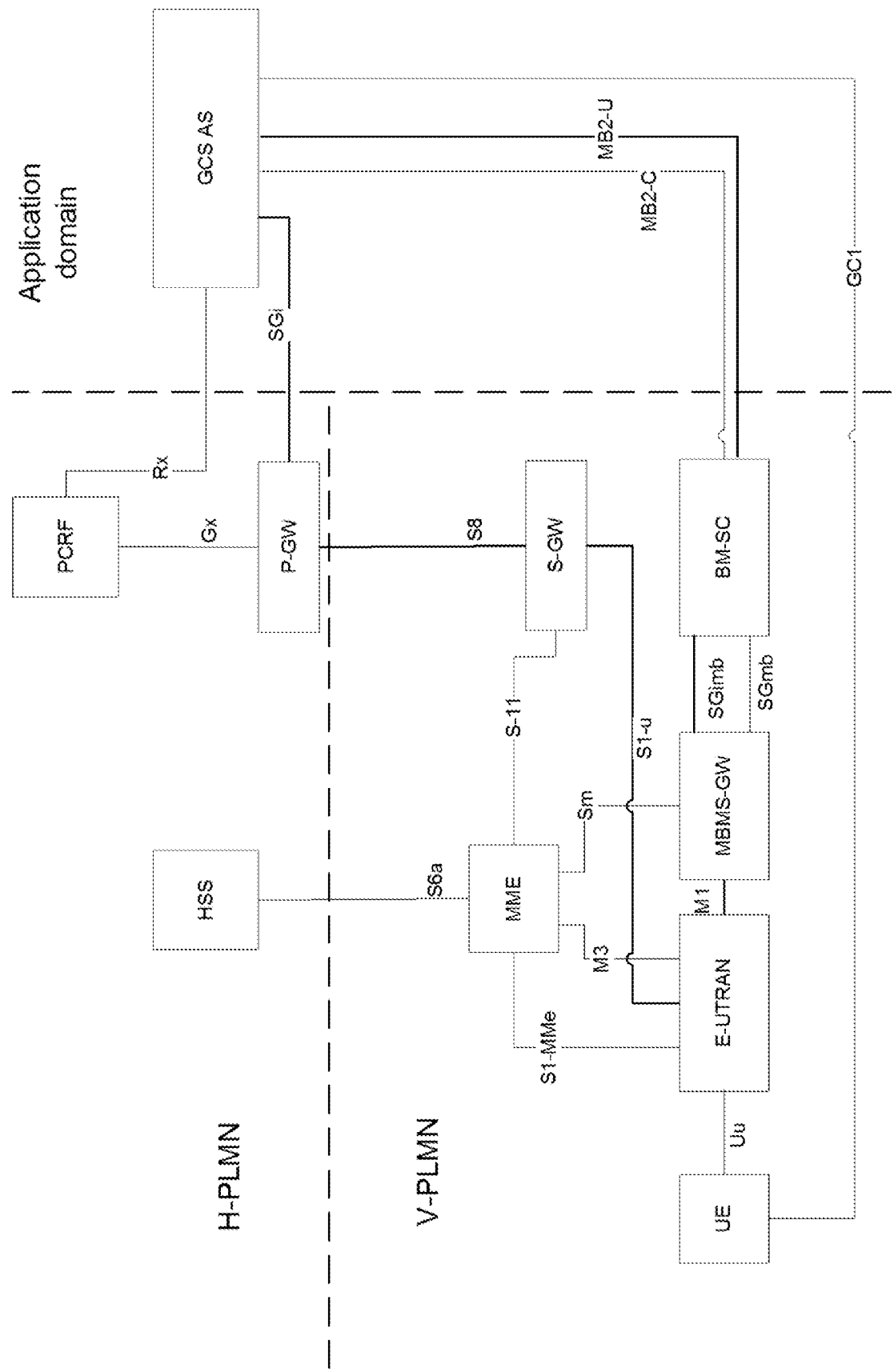
FIG. 2 illustrates an example of a network architecture for Group Communication System Enabler (GCSE) in a roaming scenario.

In the present disclosure, different embodiments are proposed to enable QCL (quasi-co location) configuration for multicast transmissions (e.g., using the MBMS architecture). The embodiments may be combined in any way.

The following description relies on multicast channels names in the LTE specifications, but it can be applied to any multicast downlink channel and associated signaling. The QCL assumptions may be applied to any control and/or data channel, such as PDCCH, PDSCH, EPDCCH.

QCL may refer to a number of assumptions that are useful at the receiver in order to correctly detect a DMRS-based transmission. QCL assumptions consist of indication regarding whether a UE (or in general a NW node) may or shall not assume that a certain channel property (e.g., delay spread, Doppler spread, Doppler shift, average gain, and average delay) is the same for a given pair of antenna ports. The antenna ports may be associated to different signals, channels and even nodes (e.g., eNBs or UEs). Additional QCL assumptions include in a non-limiting way the MBSFN subframe configuration, the CSI-RS configuration and the PDSCH start subframe.

Downlink control information (e.g., DCI format 2D) may include signaling for selecting one of several QCL assumptions by use of the so called PQI field. The information is valid for the associated PDSCH transmission.

Embodiment A: QCL Signaling for IDLE UEs

Certain embodiments may enable flexible QCL configuration for multicast transmissions, including IDLE UEs. As a non-limiting example, consider use of a TMGI, such as a TMGI that may be assigned by an MBMS server to identify an MBMS session. Assume that the eNB or another network node would typically associate a certain TMGI (temporary multicast group indicator) to a certain multicast service within a certain geographical area. This implies that the preferred QCL configuration when serving UEs within such TMGI can be assumed to not vary very dynamically. Also motivated by this consideration or other considerations, certain embodiments provide new system control information that is defined by associating QCL assumptions to specific multicast (e.g., MBMS) channels such as (SC)-

MTCH. Such mapping may be associated in a non-limiting way to specific TMGIs and/or to specific MBMS bearers. Any other association form that enables mapping QCL assumptions to a multicast transmission is also covered. Additionally, the control information may include information regarding which transmission mode (TM) should be assumed by the receiver for a certain multicast TMGI transmission. For DMRS-based transmission modes (e.g., TM10), the control information may include indication on whether a fully collocated behavior should be assumed (Behavior A) or a flexible QCL configuration is used (Behavior B).

The eNB may even signal a default QCL configuration to be used by UEs when participating in multicast reception, possibly specifying the TMGIs/channels/bearers associated to such default QCL configuration.

In certain embodiments, the eNB transmits the above system control information in order to enable RRC IDLE UEs to determine the correct QCL assumptions. In one example a broadcast and/or multicast control channel is used, and such channel may be carried by MIB and/or SIB and/or other physical channels such as (SC)-MCCH which contains the list of TMGIs supported in the MCH. The eNB is expected to transmit the TMGI using a configuration that is compatible with the associated signaled QCL assumptions. For instance the eNB, can associate to each TMGI in the (SC)-MCCH the corresponding physical layer configuration (including, for example, QCL configuration, TM, etc.), or the eNB can indicate the QCL configuration for the MCH that should apply to all the (SC)-MTCH.

A UE that is interested in detecting a certain TMGI is expected to read the associated broadcast control information and to configure its receiver with the corresponding TM behavior and QCL assumptions.

Embodiment B: Handling of UEs with Limited Capabilities

In certain situations, a UE is unable (e.g., due to limited radio capabilities or any other reason) to support the configuration (e.g., TM and QCL assumptions) associated to a TMGI of interest. For example, as discussed above, there may be a one-to-one association between an MTCH (a physical channel to be received by the UE) and a TMGI that identifies a service of interest. The UE may be described as unable to support the configuration associated to a TMGI of interest if the UE is not capable of receiving the MTCH associated with that TMGI, If the UE is unable to support the configuration associated to a TMGI of interest, the UE may signal to the NW such issue. To do so, the UE may indicate the TMGI of interest and possibly its capability. This could be done as part of an RRC signaling to the eNB for example by using InDeviceCoexIndication message.

The eNB may signal also the control information as part of SIB or any other multicast control channel whether it is support signaling reception of physical configuration coexistence issues. In any case, the eNB (or other NW node), in response to signaling from a UE that is unable to receive a certain TMGI of interest may decide to serve such UE using a different way of delivering the content of interest. For example, the NW may configure a unicast bearer for serving the UE, or it may reconfigure the multicast transmission using a format that is supported by the UE. The eNB may for instance reconfigure the multicast transmission format if the number of UEs that reported capabilities issues is above a certain threshold.

Embodiment C: Support Restriction for IDLE UEs

The eNB may intend to adapt transmission parameters for a certain TMGI (or multicast channel/bearer) in a fashion that requires an RRC CONNECTION. For example, the eNB may intend to obtain HARQ feedback and/or CSI or other measurements from UEs receiving a certain TMGI. In one example the eNB may wish to reconfigure the QCL configuration for a certain UE receiving a certain TMGI. In order to enable such possibility, in certain embodiments the eNB signals that UEs should switch to RRC CONNECTED in order to receive a certain TMGI. In another example, the eNB signals to the UE that it expects HARQ ACK/NACK reporting and/or any other feedback/report from UEs receiving a certain TMGI, which implicitly indicates that the UEs should switch to RRC CONNECTED mode in order to receive such TMGI (reporting is not supported for RRC IDLE UEs). The signaling described above can be part of the TMGI configuration and possibly part of multicast or broadcast control information. As discussed above, there may be a one-to-one association between an MTCH (a physical channel to be received by the UE) and a TMGI that identifies a service of interest. For simplicity, certain examples throughout the present disclosure describe configuring a TMGI in the sense that the TMGI is used to identify an associated MTCH to which a configuration applies.

A UE that receives the above signaling and is interested in receiving a certain TMGI should switch to RRC CONNECTED mode and report according to the configuration by the eNB. If a UE reconfigures QCL settings for a TMGI for an RRC CONNECTED UE, such configuration overrides the QCL configuration provided as part of broadcast/multicast control information.

Example Network

Figure 3:
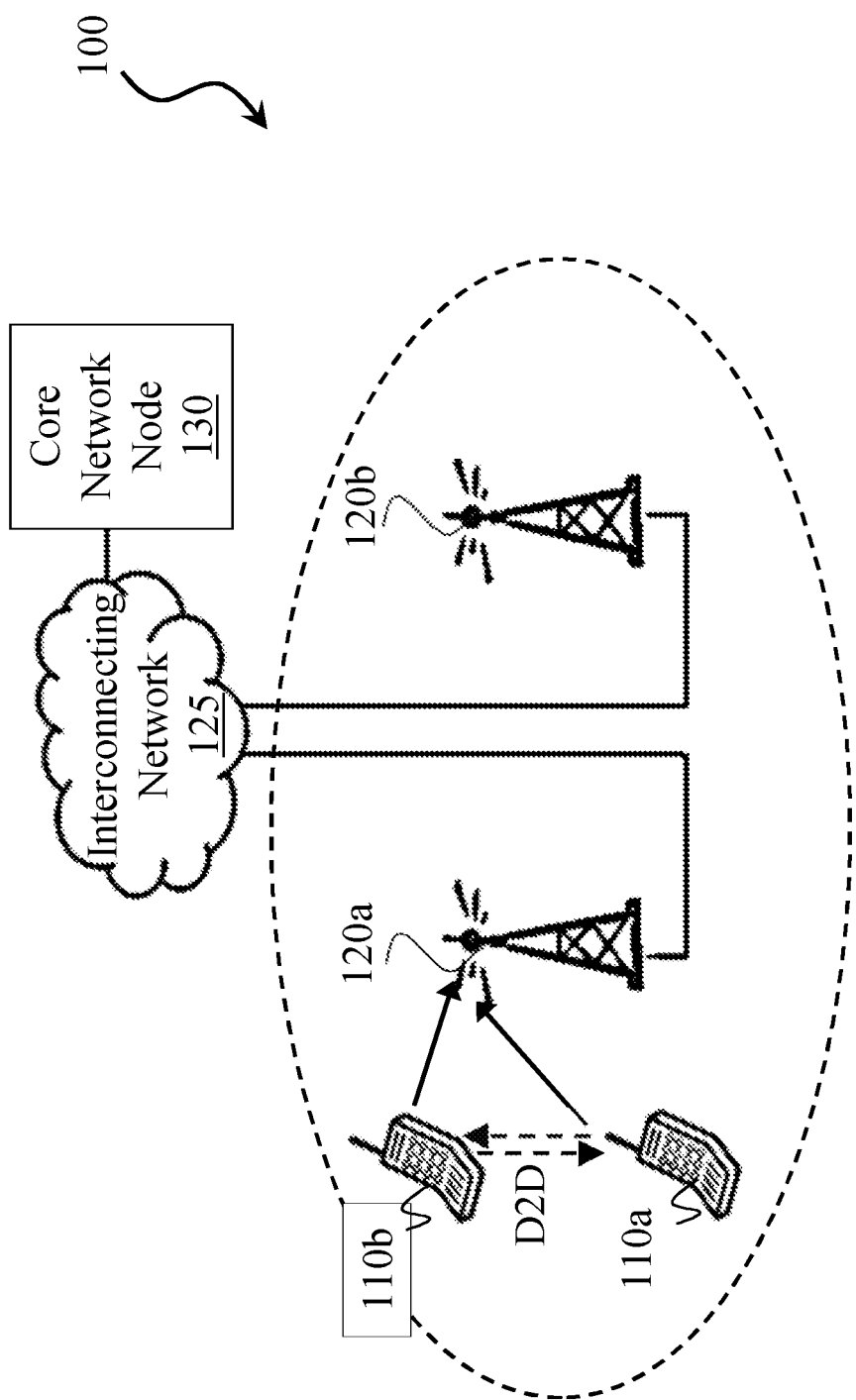
FIG. 3 is a block diagram illustrating an example of a wireless network, in accordance with certain embodiments of the present disclosure.

FIG. 3 illustrates an example of a wireless network 100 that may be used for wireless communications. Wireless network 100 includes wireless devices 110a-110b (e.g., user equipment, UEs) and a plurality of radio access nodes 120a-120b (e.g., eNBs or base stations) connected to one or more core network nodes 130 via an interconnecting network 125. Wireless devices 110 within coverage area 115 may each be capable of communicating directly with radio access nodes 120 over a wireless interface. Wireless devices may also be capable of communicating with each other via device-to-device (D2D) communication.

As an example, wireless device 110a may communicate with radio access node 120a over a wireless interface. That is, wireless device 110a may transmit wireless signals and/or receive wireless signals from radio access node 120a. The wireless signals may contain voice traffic, data traffic, control signals, and/or any other suitable information. In some embodiments, an area of wireless signal coverage associated with a radio access node 120 may be referred to as a cell.

In some embodiments wireless device 110 may be interchangeably referred to by the non-limiting term user equipment (UE). Wireless device 110 refers to any type of wireless device communicating with a network node and/or with another UE in a cellular or mobile communication system. Examples of UE are target device, device to device (D2D) UE, V2x UE, machine type UE or UE capable of machine to machine (M2M) communication, PDA, PAD, Tablet, mobile terminals, smart phone, laptop embedded equipped (LEE), laptop mounted equipment (LME), USB dongles, etc. The wireless device, e.g. capable of V2X sidelink communication, may for example be comprised in a vehicle, such as being an integrated part of a vehicle, or as a separate device attached to a vehicle. Thus, although FIG. 3 illustrates wireless devices 110 as phones, other embodiments may use other types of wireless devices 110. Example embodiments of wireless device 110 are described in more detail below with respect to FIG. 4.

In some embodiments radio access node 120 may be interchangeably referred to by the non-limiting terms eNB, base station, network node, or WAN node. The WAN node can be a UE (e.g. D2D UE) or a network node (e.g., access point, base station, cellular node, etc.). Example embodiments of radio access node 120 are described in more detail below with respect to FIG. 5.

In certain embodiments, radio access nodes 120 may interface with a radio network controller. The radio network controller may control radio access nodes 120 and may provide certain radio resource management functions, mobility management functions, and/or other suitable functions. In certain embodiments, the functions of the radio network controller may be included in radio access node 120. The radio network controller may interface with a core network node 130. In certain embodiments, the radio network controller may interface with the core network node 130 via an interconnecting network 125.

The interconnecting network 125 may refer to any interconnecting system capable of transmitting audio, video, signals, data, messages, or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 130 may manage the establishment of communication sessions and various other functionalities for wireless devices 110. Wireless devices 110 may exchange certain signals with the core network node using the non-access stratum layer. In non-access stratum signaling, signals between wireless devices 110 and the core network node 130 may be transparently passed through the radio access network. In certain embodiments, radio access nodes 120 may interface with one or more network nodes over an internode interface. For example, radio access nodes 120a and 120b may interface over an X2 interface.

Although FIG. 3 illustrates a particular arrangement of network 100, the present disclosure contemplates that the various embodiments described herein may be applied to a variety of networks having any suitable configuration. For example, network 100 may include any suitable number of wireless devices 110 and radio access nodes 120, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While the embodiments are described for LTE, the embodiments are applicable to any RAT, such as LTE FDD/TDD, WCDMA/HSPA, GSM/GERAN, Wi Fi, WLAN, CDMA2000, etc.

Figure 4:
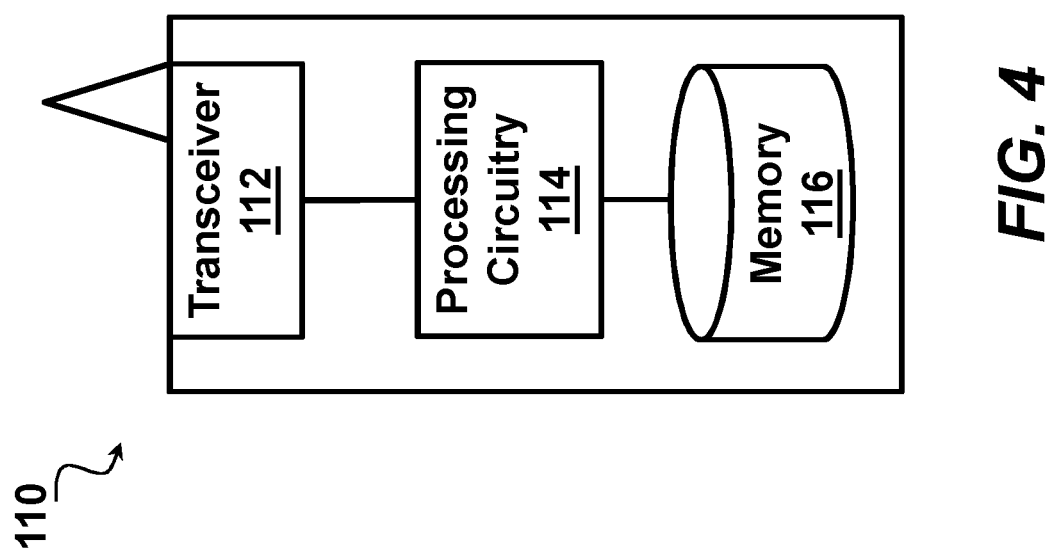
FIG. 4 is a block diagram illustrating an example of a wireless device, in accordance with certain embodiments of the present disclosure.

FIG. 4 is a block diagram of an exemplary wireless device 110, in accordance with certain embodiments. Wireless device 110 includes a transceiver 112, processing circuitry 114 (e.g., comprising one or more processors), and memory 116. In some embodiments, transceiver 112 facilitates transmitting wireless signals to and receiving wireless signals from network node/WAN node/radio access node 120 (e.g., via an antenna), processing circuitry 114 executes instructions to provide some or all of the functionality described herein as being provided by a wireless device (or UE), and memory 116 stores the instructions executed by processing circuitry 114.

Processing circuitry 114 may include any suitable combination of hardware and software implemented in one or more modules to execute instructions and manipulate data to perform some or all of the described functions of wireless device 110, such as the functions of the wireless device (or UE) described above and/or functionality of wireless device 110 described below with respect to FIGS. 6-12. In some embodiments, processing circuitry 114 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processor may comprise one or more of the modules discussed below with respect to FIG. 14 and/or FIG. 16.

Memory 116 is generally operable to store instructions, such as a computer program, software, an application including one or more of logic, rules, algorithms, code, tables, etc. and/or other instructions capable of being executed by a processor. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 114 of wireless device 110.

Other embodiments of wireless device 110 may include additional components beyond those shown in FIG. 4 that may be responsible for providing certain aspects of the wireless device's functionality, including any of the functionality described herein and/or any additional functionality (including any functionality necessary to support the solution described herein). As just one example, wireless device 110 may include input devices and circuits, output devices, and one or more synchronization units or circuits, which may be part of the processing circuitry. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 5:
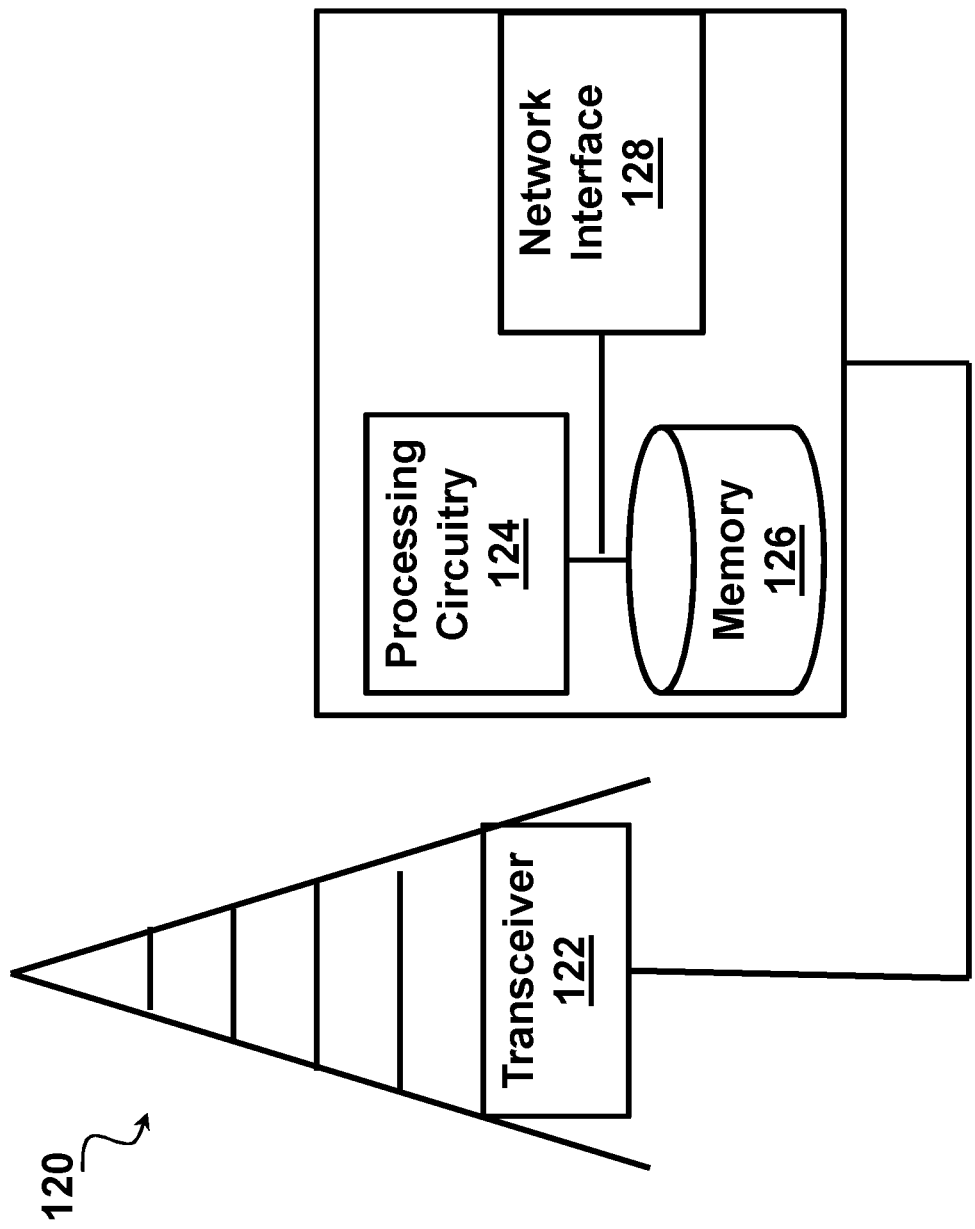
FIG. 5 is a block diagram illustrating an example of a network node, in accordance with certain embodiments of the present disclosure.

FIG. 5 is a block diagram of an exemplary network node 120, in accordance with certain embodiments. Network node 120 may include one or more of a transceiver 122, processing circuitry 124 (e.g., comprising one or more processors), memory 126, and network interface 128. In some embodiments, transceiver 122 facilitates transmitting wireless signals to and receiving wireless signals from wireless device 110 (e.g., via an antenna), processing circuitry 124 executes instructions to provide some or all of the functionality described herein as being provided by a network node 120, memory 126 stores the instructions executed by processing circuitry 124, and network interface 128 communicates signals to backend network components, such as a gateway, switch, router, Internet, Public Switched Telephone Network (PSTN), core network nodes or radio network controllers, etc.

Processing circuitry 124 may include any suitable combination of hardware and software implemented in one or more modules to execute instructions and manipulate data to perform some or all of the described functions of network node 120, such as functions of a network node described above and/or functions of network node 120 described below with respect to FIGS. 6-12. In some embodiments, processing circuitry 124 may include, for example, one or more computers, one or more central processing units (CPUs), one or more microprocessors, one or more applications, and/or other logic. In certain embodiments, processing circuitry 124 may comprise one or more of the modules discussed below with respect to FIG. 13 and/or FIG. 15.

Memory 126 is generally operable to store instructions, such as a computer program, software, an application including one or more of logic, rules, algorithms, code, tables, etc. and/or other instructions capable of being executed by a processor. Examples of memory 126 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 128 is communicatively coupled to processing circuitry 124, and network interface 128 may refer to any suitable device operable to receive input for network node 120, send output from network node 120, perform suitable processing of the input or output or both, communicate to other devices, or any combination of the preceding. Network interface 128 may include appropriate hardware (e.g., port, modem, network interface card, etc.) and software, including protocol conversion and data processing capabilities, to communicate through a network.

Other embodiments of network node 120 may include additional components beyond those shown in FIG. 5 that may be responsible for providing certain aspects of the radio network node's functionality, including any of the functionality described herein and/or any additional functionality (including any functionality necessary to support the solutions described herein). The various different types of network nodes may include components having the same physical hardware but configured (e.g., via programming) to support different radio access technologies, or may represent partly or entirely different physical components.

Figure 6:
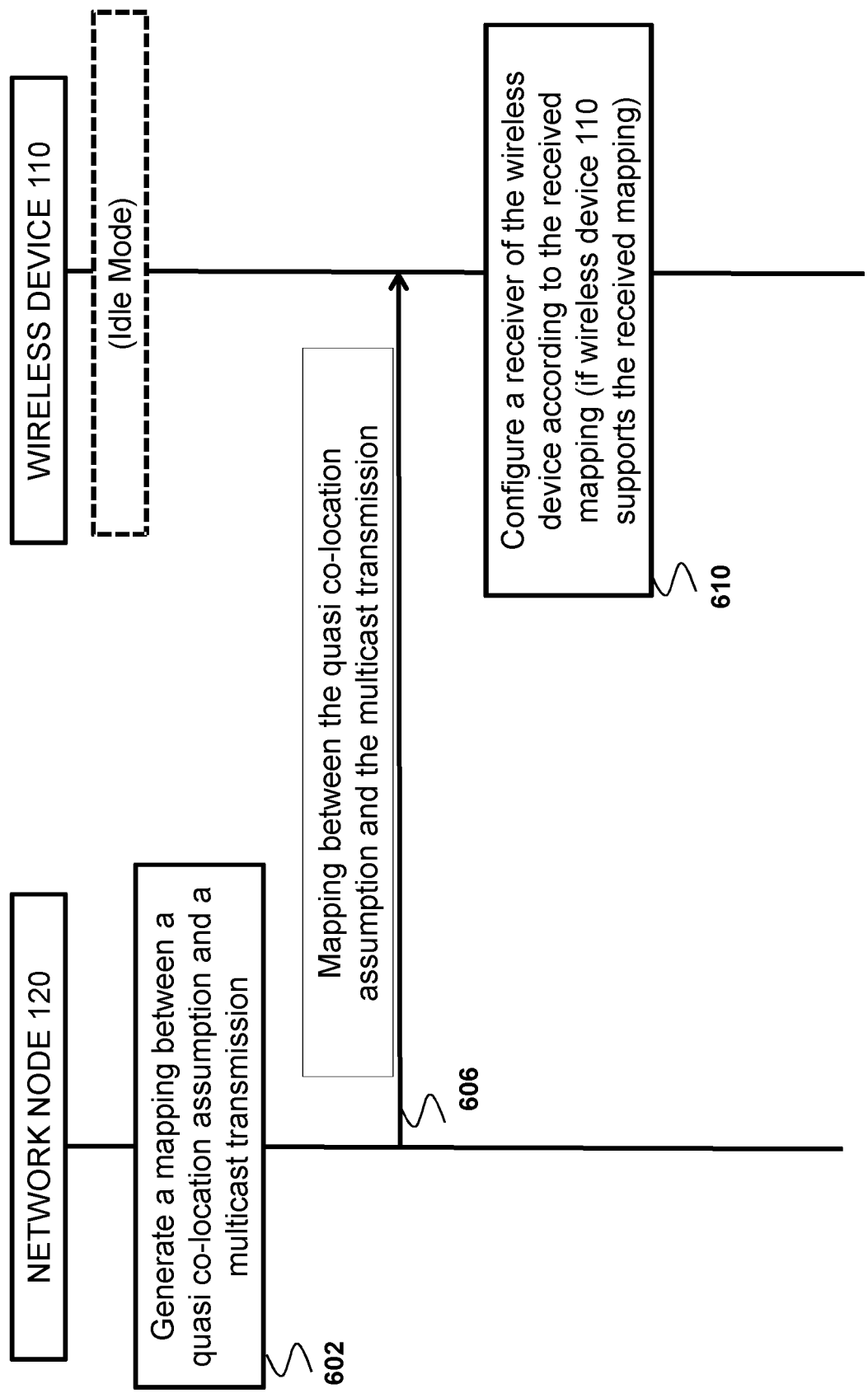
FIG. 6-12 are signal flow diagrams illustrating examples of methods for sending a QCL assumption to a wireless device in idle mode, in accordance with certain embodiments of the present disclosure.

FIG. 6 is a flow diagram illustrating an example embodiment. At step 602, a network node 120 generates a mapping between a quasi co-location (QCL) assumption and a multicast transmission. At step 606, the network node 120 sends and a wireless device 110 receives the mapping between the QCL assumption and the multicast transmission. FIG. 6 shows that the wireless device 110 is in idle mode (e.g., RRC idle mode). Thus, in certain embodiments, the network node 120 sends the mapping via broadcast information, such as via one or more MIBs and/or SIBs. At step 610, the wireless device 110 configures its receiver according to the received mapping (e.g., if the wireless device 110 supports the mapping).

Figure 7:
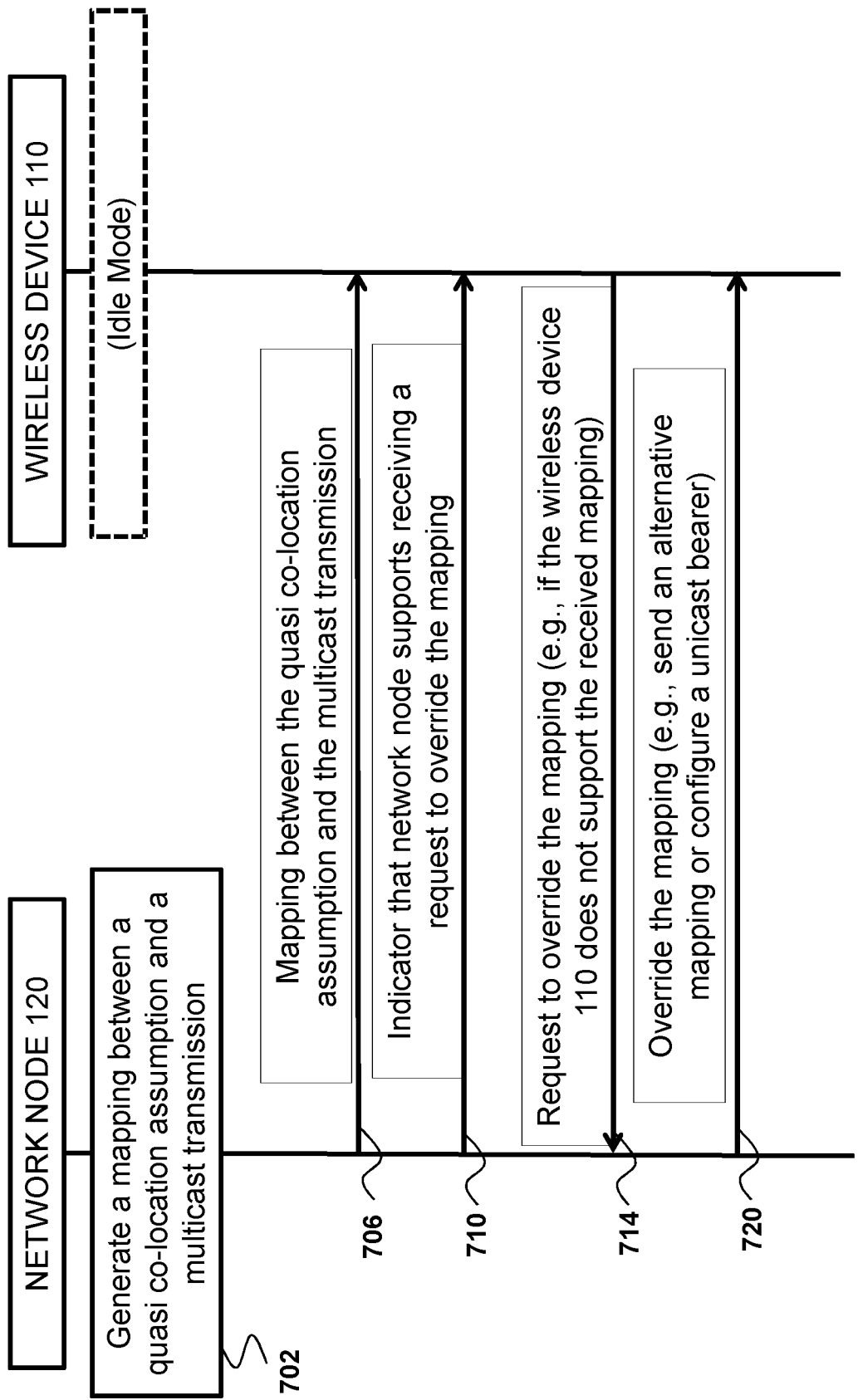

FIG. 7 is a flow diagram illustrating another example embodiment. At step 702, a network node 120 generates a mapping between a quasi co-location (QCL) assumption and a multicast transmission. At step 706, the network node 120 sends and a wireless device 110 receives the mapping between the QCL assumption and the multicast transmission. FIG. 7 shows that the wireless device 110 is in idle mode (e.g., RRC idle mode). Thus, in certain embodiments, the network node 120 sends the mapping via broadcast information, such as via one or more MIBs and/or SIBs. At step 710, the network node 120 sends an indicator that it supports receiving a request to override the mapping. At step 714, the wireless device 110 requests to override the mapping, for example, if the wireless device 110 does not support the received mapping. The request may optionally include information about the QCL assumptions and/or multicast transmissions that the wireless device 110 is capable of supporting. At step 720, the network node 120 overrides the mapping. In some embodiments, the network node 120 overrides the mapping by sending an alternative mapping (such as a mapping comprising a QCL and multicast transmission that the wireless device supports) or by configuring a unicast bearer for the wireless device.

Figure 8:
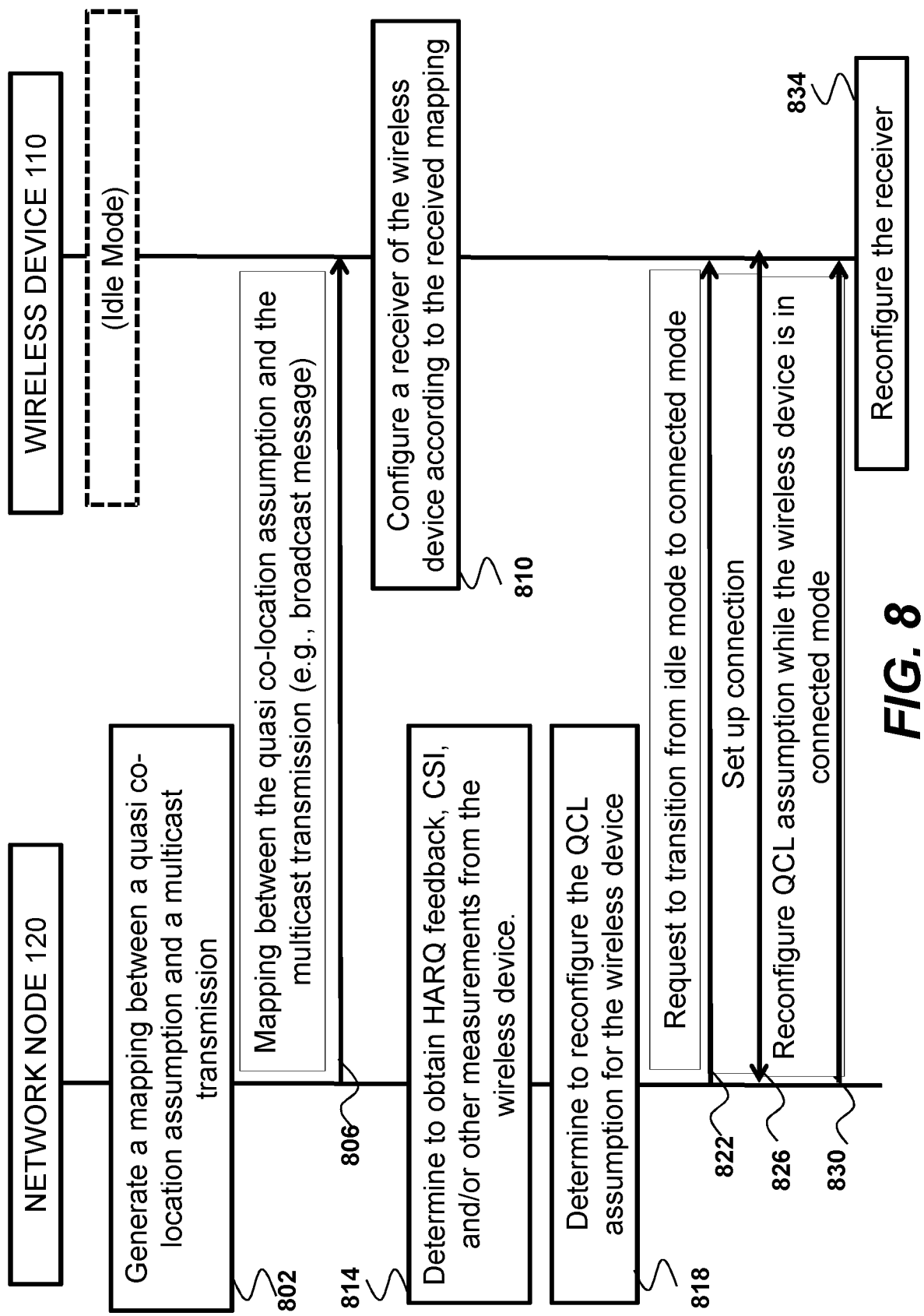

FIG. 8 is a flow diagram illustrating another example embodiment. At step 802, a network node 120 generates a mapping between a quasi co-location (QCL) assumption and a multicast transmission. At step 806, the network node 120 sends and a wireless device 110 receives the mapping between the QCL assumption and the multicast transmission. FIG. 8 shows that the wireless device 110 is in idle mode (e.g., RRC idle mode). Thus, in certain embodiments, the network node 120 sends the mapping via broadcast information, such as via one or more MIBs and/or SIBs. At step 810, the wireless device 110 configures its receiver according to the received mapping (e.g., if the wireless device 110 supports the mapping). At step 814, the network node 120 determines to obtain HARQ feedback, CSI, and/or other measurements from the wireless device 110. In response to the determination, the network node 120 determines at step 818 to reconfigure the QCL assumption for the wireless device 110. At step 822, the network node 120 requests the wireless device 110 to transition from idle mode to connected mode. At step 826, a connection is set up (e.g., RRC connection). At step 830, the network node 120 reconfigures the QCL assumption while the wireless device 110 is in connected mode. In step 834, the wireless device 110 reconfigures its receiver based on the reconfigured QCL assumption received in step 830. In certain embodiments, transitioning the wireless device 110 from idle mode to connected mode to reconfigure the QCL assumption allows for that particular wireless device 110 to not use/reconfigure/override the QCL mapping that was broadcast by the network node 120, while other wireless devices 110 may continue to use the QCL mapping being broadcasted by the network node.

Figure 9:
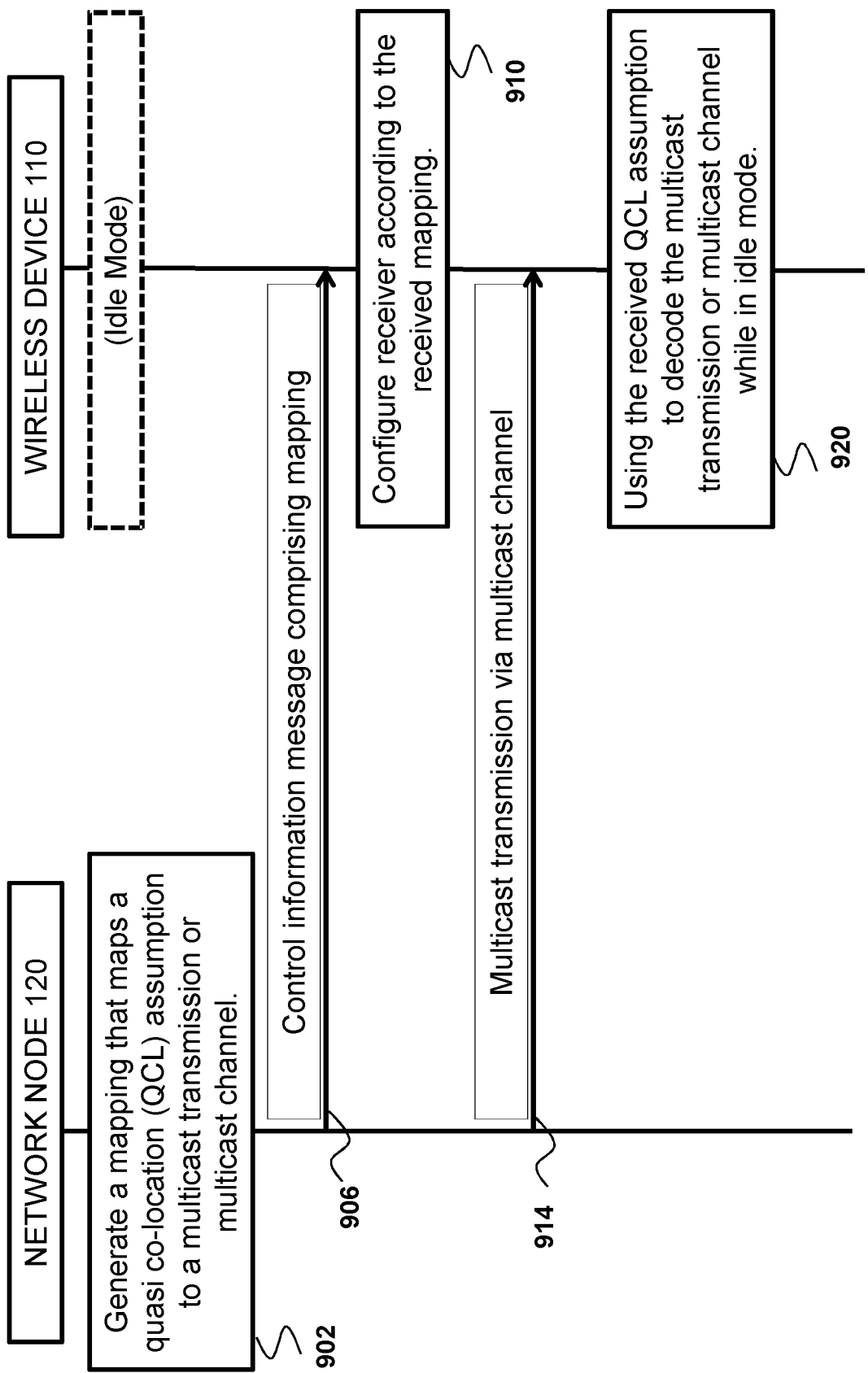

FIG. 9 illustrates another example of a signal flow between network node 120 and wireless device 110, according to certain embodiments. The method begins with wireless device 110 in idle mode. At step 902, network node 120 generates a mapping that maps a QCL assumption to a multicast transmission or multicast channel. The mapping can map the QCL assumption to the multicast transmission or multicast channel in any suitable manner. As an example, in certain embodiments, the mapping maps the QCL assumption to a TMGI that network node 120 associates with the multicast transmission or multicast channel. The TMGI may be used to identify an associated MTCH to which the QCL assumption applies. As another example, in certain embodiments, the multicast transmission or multicast channel is associated with an MBMS bearer, and the mapping maps the QCL assumption to the MBMS bearer. The QCL assumption may comprise any suitable information, such as whether wireless device 110 should assume fully collocated behavior or a flexible quasi co-location configuration. In certain embodiments, the QCL assumption comprises a default QCL configuration to be used by the wireless devices 110 when receiving the multicast transmission or multicast channel.

At step 906, network node 120 sends a control information message to wireless device 110, which wireless device 110 receives while in idle mode. For example, the control information message can be sent in broadcast information via a MIB and/or a SIB. The control information message comprises the mapping that maps the QCL assumption to the multicast transmission or multicast channel. In certain embodiments that map the QCL assumption to a TMGI, the control information message also includes information regarding which transmission mode (TM) a receiver of the wireless device 110 should assume for the multicast transmission or multicast channel associated with the TMGI.

At step 910, wireless device 110 configures its receiver according to the received mapping. For example, wireless device may configure the receiver in response to determining that it is capable of supporting the QCL assumption and determining to use the TMGI associated with the multicast transmission or multicast channel indicated by the mapping.

At step 914, network node 120 transmits the multicast transmission via the multicast channel. At step 920, wireless device 110 uses the QCL assumption received in step 906 to decode the multicast transmission or multicast channel while in idle mode.

Figure 10:
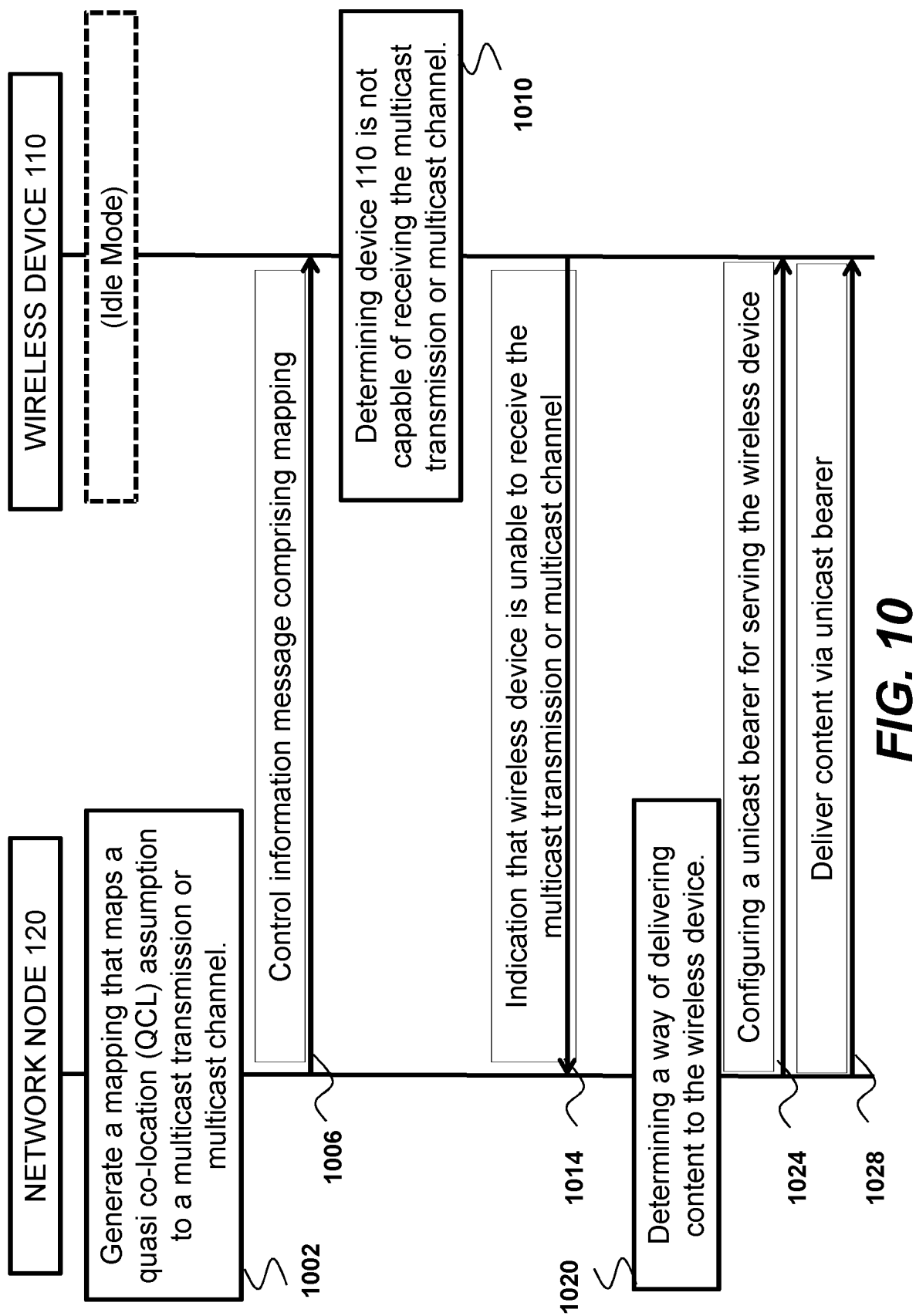

FIG. 10 illustrates another example of a signal flow between network node 120 and wireless device 110, according to certain embodiments. The method begins with wireless device 110 in idle mode. Steps 1002 and 1006 are analogous to steps 902 and 906 of FIG. 9, respectively. At step 1010, wireless device 110 determines that it does not support the mapping received in step 1006, for example, based on comparing the QCL and/or TM assumptions received from the network node 120 to the current capabilities of wireless device 110. Thus, wireless device 110 does not configure its receiver according to the received mapping.

At step 1014, wireless device 110 sends and network node 120 receives an indication that wireless device 110 is unable to receive the multicast transmission or multicast channel. For example, in certain embodiments that associate the mapping with a TMGI, the wireless device uses the TMGI to identify the multicast transmission or multicast channel for which the wireless device 110 does not support the QCL assumption or TM assumption that the network node 120 provided in control information message 1006.

At step 1020, network node 120 determines a way of delivering content to the wireless device 110 other than using the QCL assumption or TM assumption that the wireless device 110 is unable to receive (e.g., as identified by the TMGI). For example, at step 1024, network node 120 configures a unicast bearer for serving the wireless device 110 and at step 1028 content is delivered to wireless device 110 via the unicast bearer.

Figure 11:
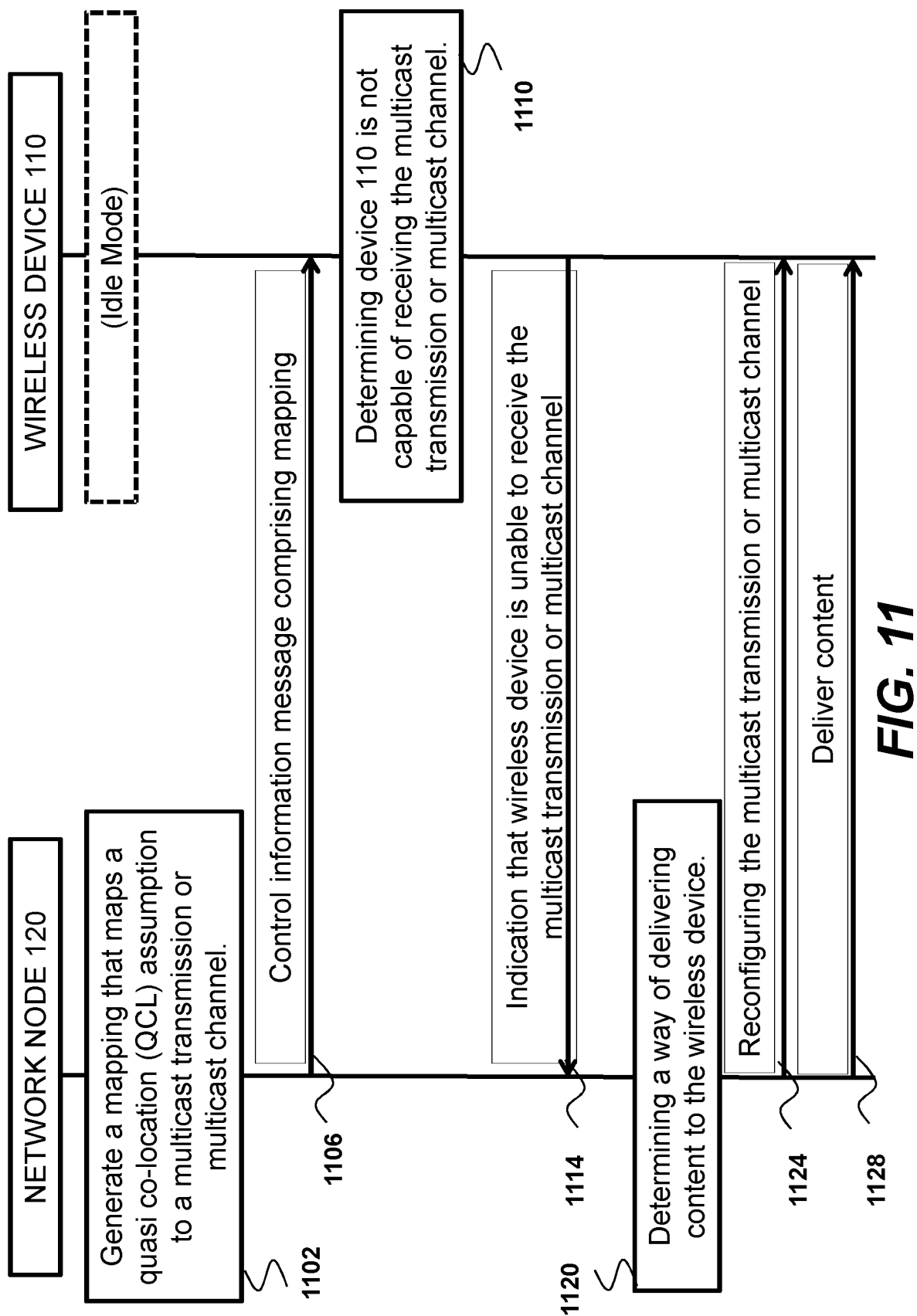

FIG. 11 illustrates another example of a signal flow between network node 120 and wireless device 110, according to certain embodiments. The method begins with wireless device 110 in idle mode. Steps 1102-1120 are analogous to the corresponding steps 1002-1020 in FIG. 10. At step 1124, network node 120 reconfigures the multicast transmission or multicast channel such that the multicast transmission or multicast channel configuration is supported by the wireless device 110. In certain embodiments, network node 120 uses the TMGI identify and associate the reconfiguration information with the multicast transmission or multicast channel. Wireless device 110 receives the reconfiguration and configures its receiver accordingly (e.g., in response to determining that the new configuration is supported and determining to use the multicast transmission/channel associated with the TMGI). At step 1128, network node 120 delivers content to wireless device 110 via the reconfigured multicast transmission/multicast channel according to the reconfiguration information sent in step 1124.

Figure 12:
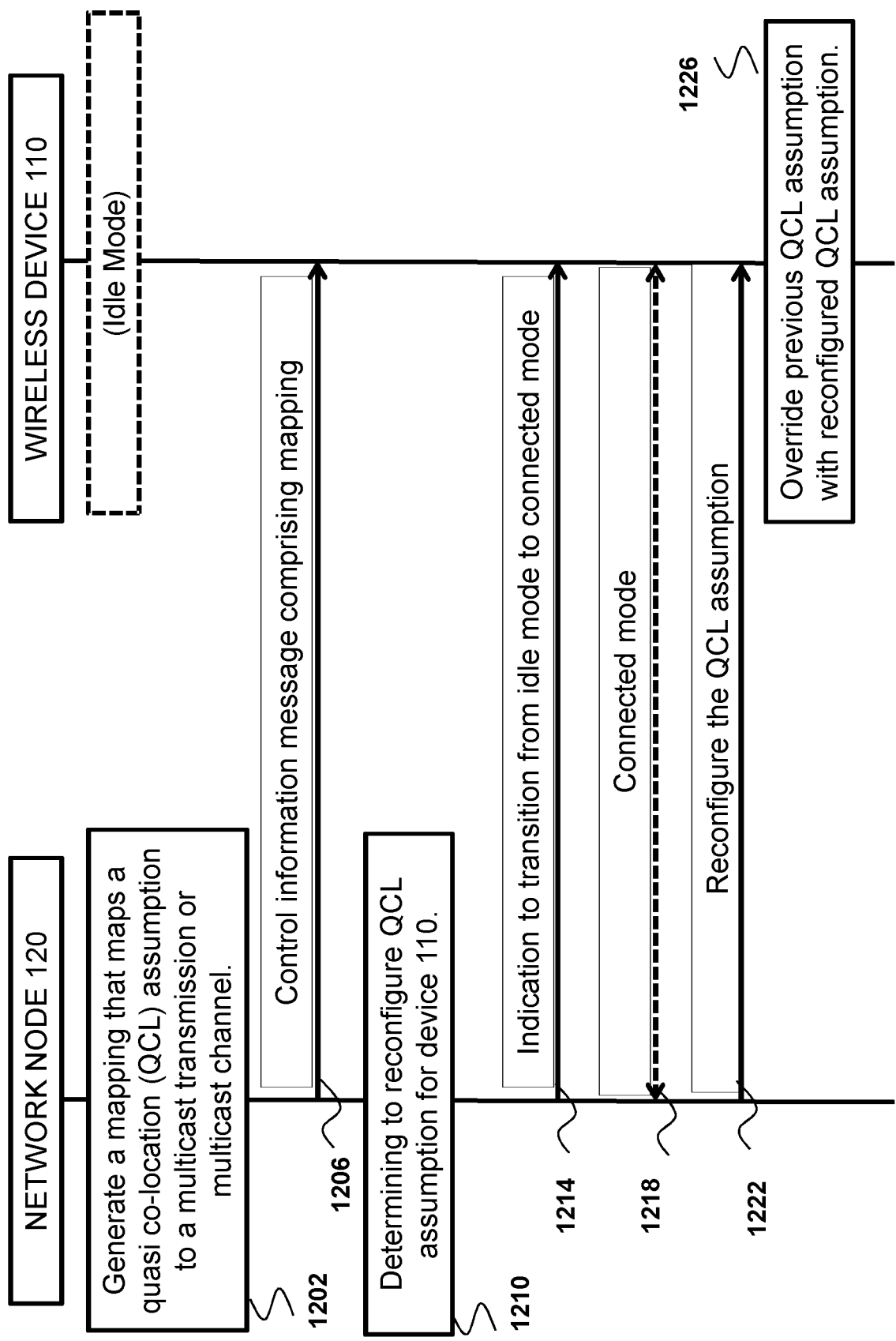

FIG. 12 illustrates another example of a signal flow between network node 120 and wireless device 110, according to certain embodiments. The method begins with wireless device 110 in idle mode. Steps 1202 and 1206 are analogous to steps 902 and 906 of FIG. 9, respectively. At step 1210, network node 120 determines to reconfigure the QCL assumption of the multicast transmission or multicast channel associated with the TMGI at least with respect to the wireless device 110.

At step 1214, network node 120 communicates and wireless device 110 receives an indication. The indication indicates that the wireless device 110 that is receiving the multicast transmission or multicast channel associated with a TMGI of interest should transition from idle mode to connected mode. The indication can be communicated as an explicit request to transition to connected mode, or the indication can be implicit. For example, network node 120 can request to obtain HARQ feedback, CSI, and/or other measurements that the wireless device 110 is configured to communicate while in connected mode, thereby causing the wireless device 110 to transition to connected mode.

At step 1218, the network node 120 and wireless device 110 are in connected mode. At step 1222, network node 120 reconfigures the QCL assumption while the wireless device is in connected mode. The TMGI can be used to identify the multicast transmission or multicast channel being reconfigured. With respect to the wireless device 110, the reconfigured QCL assumption overrides the previous QCL assumption (see step 1226). The QCL assumption need not be reconfigured for other wireless devices that remain in idle mode.

Figure 13:
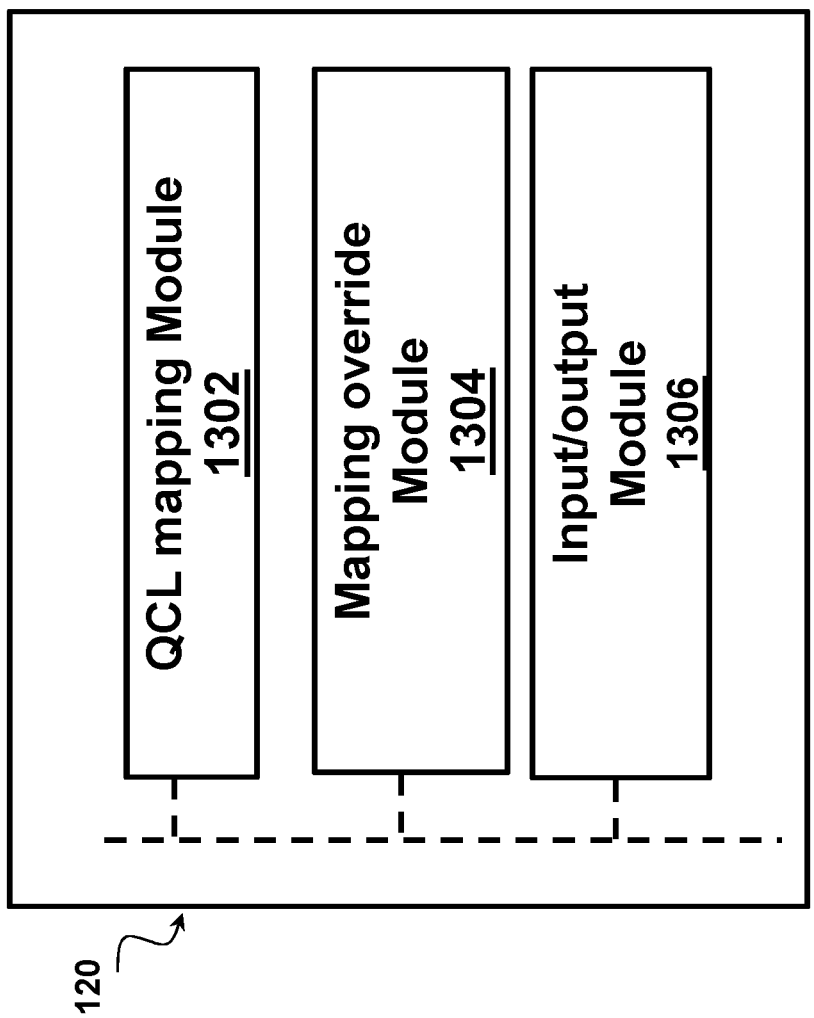
FIG. 13 is a block diagram illustrating an example of modules of a network node, in accordance with certain embodiments of the present disclosure.

FIG. 13 illustrates examples of modules of network node 120, according to certain embodiments. Network node 120 may comprise one or more of a QCL mapping module 1302, a mapping override module 1304, and an input/output module 1306. QCL mapping module 1302 may generate a mapping that maps a quasi co-location assumption to a multicast transmission. Input/output module 1306 may cause the mapping to be sent to a wireless device 110. Mapping override module 1304 may generate an indicator indicating whether the network node 120 supports overriding the mapping. Input/output module 1306 may cause the indicator to be sent to a wireless device 110. If the network node 120 supports overriding the mapping, input/output module may receive an override request from wireless device 110, for example, the override request may indicate that wireless device 110 does not support the received mapping. The override request optionally includes information about the QCL assumptions and/or multicast transmission supported by the wireless device 110. Mapping override module 1304 may generate an alternative mapping (e.g., a mapping that is supported by the wireless device 110) or may configure a unicast bearer for the wireless device 110. In some embodiments, mapping override module 1304 may generate an alternative mapping without having to receive an override request from the wireless device 110. For example, in response to a determination to obtain HARQ feedback, CSI, and/or other measurements from the wireless device 110, mapping override module may determine to reconfigure the QCL assumption for the wireless device 110. Input/output module 1306 may send messages to cause the wireless device 110 to transition from idle mode to connected mode so that the QCL assumption may be reconfigured.

Figure 14:
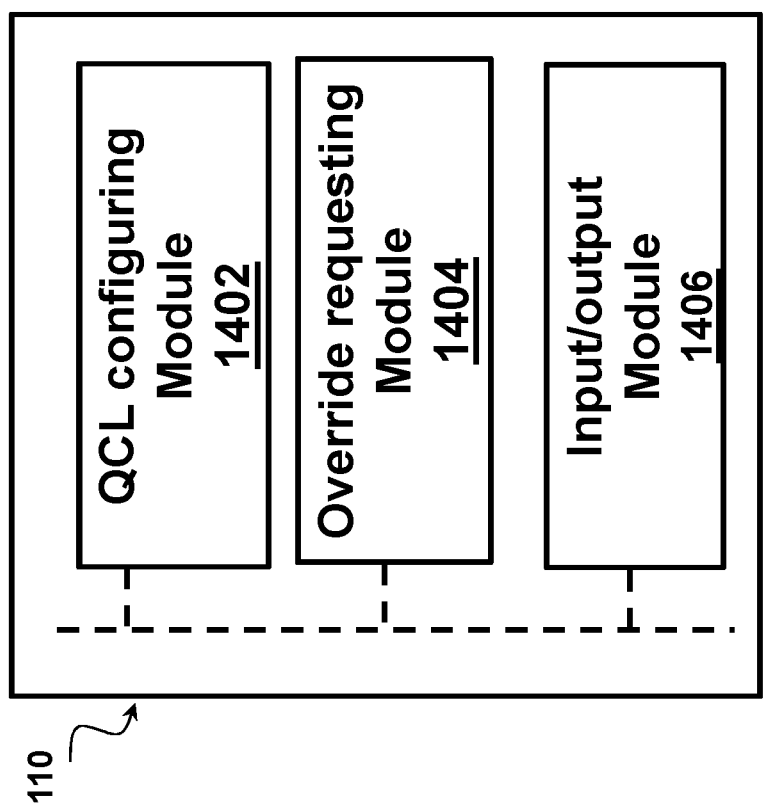
FIG. 14 is a block diagram illustrating an example of modules of a wireless device, in accordance with certain embodiments of the present disclosure.

FIG. 14 illustrates examples of modules of wireless device 110, according to certain embodiments. Wireless device 110 may comprise one or more of a QCL configuring module 1402, an override requesting module 1404, and an input/output module 1406. Input/output module 1406 may receive a mapping from network node 120 and may communicate the mapping to the QCL configuring module 1402. The mapping maps a quasi co-location assumption to a multicast transmission. QCL configuring module 1402 configures the wireless device 110's receiver according to the mapping, for example, if the mapping is supported. If the mapping is not supported, override requesting module 1404 may generate and input/output module 1406 may send network node 120 a request to override the mapping. The override request may indicate that wireless device 110 does not support the received mapping. The override request optionally includes information about the QCL assumptions and/or multicast transmission supported by the wireless device 110. In some embodiments, input/output module 1406 receives an alternative mapping from the network node 120 and communicates the alternative mapping to the QCL configuring module 1402. The QCL configuring module 1402 configures the receiver of wireless device 110 according to the alternative mapping.

Figure 15:
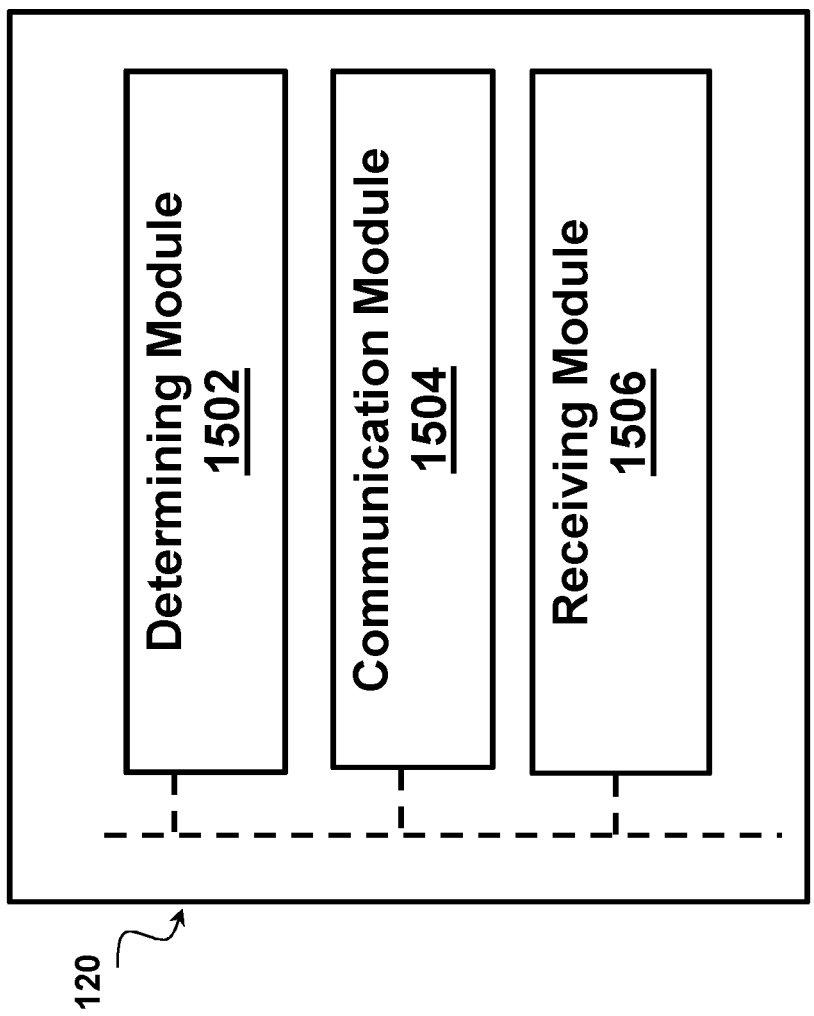
FIG. 15 is a block diagram illustrating an example of modules of a network node, in accordance with certain embodiments of the present disclosure.

FIG. 15 illustrates examples of modules that can be included in network node 120. In certain embodiments, network node 120 may include any one or more of determining module(s) 1502, communication module(s) 1504, receiving module(s) 1506, and/or other suitable modules. The functionality of the modules may be integrated in a single component or separated among several components in any suitable manner. In certain embodiments, one or more of the modules may be implemented using processing circuitry 124 described with respect to FIG. 5.

Determining module 1502 may perform the processing functions of network node 120 (including any of the network node functionality to support the above-described embodiments). As an example, determining module 1502 may generate a mapping between a quasi co-location assumption and a multicast transmission. As another example, determining module 1502 may determine whether to deliver content to a wireless device 110 using the mapping. If determining module 1502 determines not to use the mapping, it can determine another way of delivering the content, such as by setting up a unicast bearer or reconfiguring the QCL assumption for wireless device 110. In some embodiments, determining module 1502 determines to reconfigure the QCL assumption for a particular wireless device 110 and further determines to send an indication for that wireless device 110 to transition to connected mode so that the wireless device 110 can receive the reconfigured QCL assumption. Determining module 1502 can further determine whether to send the indication to transition to connected mode as an explicit request or an implicit request.

Determining module 1502 may include analog and/or digital circuitry configured to perform any of the functions of determining module 1502 and/or processing circuitry 124 described above. The functions of determining module 1502 described above may, in certain embodiments, be performed in one or more distinct modules.

Communication module 1504 may perform the transmission functions of network node 120. As one example, communication module 1504 may a mapping between a QCL assumption and a multicast transmission or multicast channel. As additional examples, communication module 1504 may be configured to communicate any one or more of the messages shown in FIGS. 6-12 as being communicated by network node 120. Communication module 1504 may include a transmitter and/or a transceiver, such as transceiver 122 described above in relation to FIG. 5. As another example, communication module 1504 may send information to other network nodes 120. Communication module 1504 may include a network interface, such as interface 128 described above in relation to FIG. 5. Communication module 1504 may include circuitry configured to transmit wireless and/or wired messages and/or signals. In particular embodiments, communication module 1504 may receive messages and/or signals for transmission from determining module 1502. In certain embodiments, the functions of communication module 1504 described above may be performed in one or more distinct modules.

Receiving module 1506 may perform the receiving functions of network node 120. For example, receiving module 1506 may receive any one or more of the messages shown in FIGS. 6-12 as being received by network node 120. Receiving module 1506 may include a receiver and/or a transceiver, such as transceiver 122 described above in relation to FIG. 5. As another example, receiving module 1506 may receive information from other network nodes 120. Receiving module 1506 may include a network interface, such as interface 128 described in relation to FIG. 5. Receiving module 1506 may include circuitry configured to receive wireless and/or wired messages and/or signals. In particular embodiments, receiving module 1506 may communicate received messages and/or signals to determining module 1502. The functions of receiving module 1506 described above may, in certain embodiments, be performed in one or more distinct modules.

In certain embodiments, some or all of the modules shown in FIG. 15 can be combined with one or more modules shown in FIG. 13. As an example, certain embodiments may combine at least some of the functionality of input/output module 1306 with at least some of the functionality of communication module 1504 and/or receiving module 1506.

Figure 16:
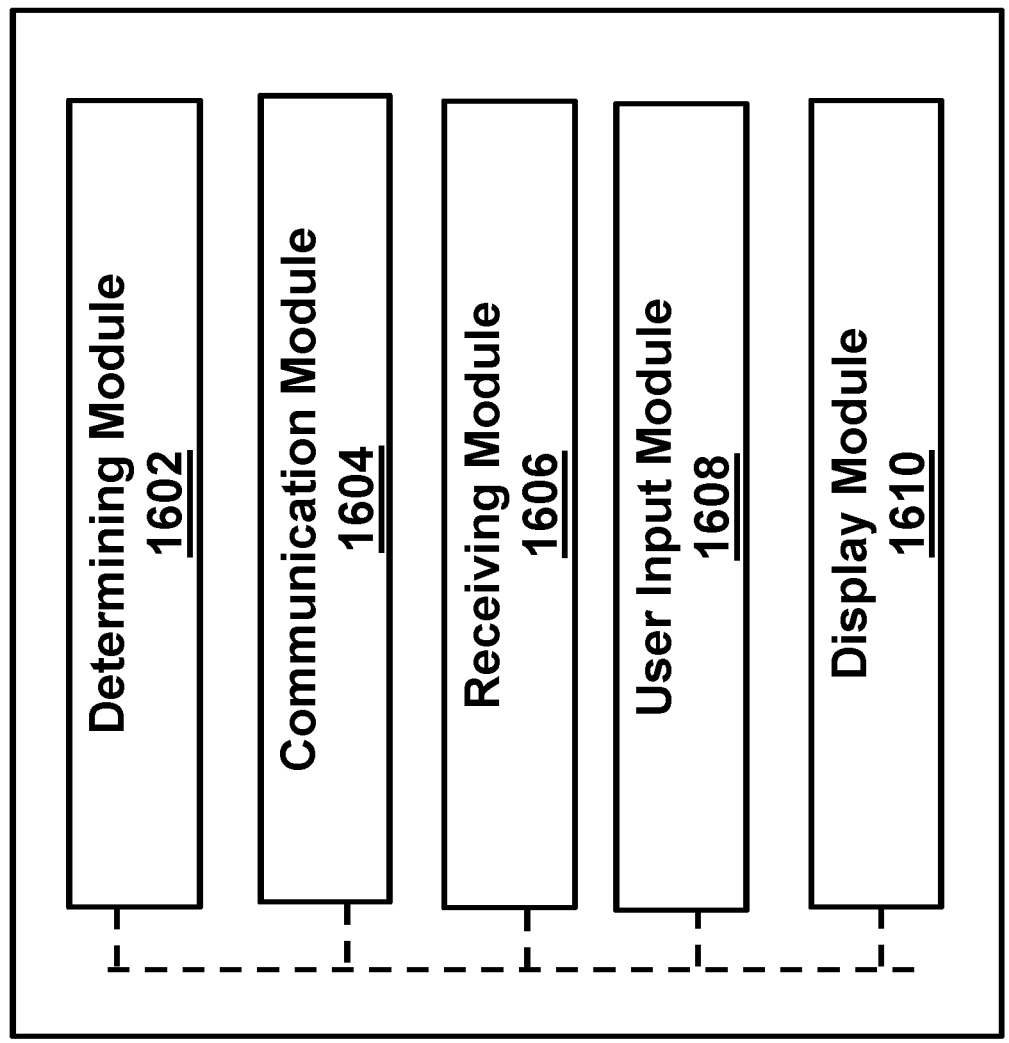
FIG. 16 is a block diagram illustrating an example of modules of a wireless device, in accordance with certain embodiments of the present disclosure.

FIG. 16 illustrates examples of modules that can be included in wireless device 110. In certain embodiments, wireless device 110 may include any one or more of determining module(s) 1602, communication module(s) 1604, receiving module(s) 1606, user input module(s) 1608, display module(s) 1610, and/or other suitable modules. The functionality of the modules may be integrated in a single component or separated among several components in any suitable manner. In certain embodiments, one or more of the modules may be implemented using processing circuitry 114 described with respect to FIG. 4.

Determining module 1602 may perform the processing functions of wireless device 110 (including any of the UE functionality to support the above-described embodiments). As one example, determining module 1602 may determine whether a received QCL assumption is supported and, if so, whether to configure a receiver of wireless device 110 accordingly. For example, in certain embodiments, the QCL assumption may be mapped to a TMGI, and determining module 1602 may determine to use a service associated with the TMGI and thus to configure the receiver accordingly.

Determining module 1602 may include or be included in one or more processors, such as processing circuitry 114 described above in relation to FIG. 4. Determining module 1602 may include analog and/or digital circuitry configured to perform any of the functions of determining module 1602 and/or processing circuitry 114 described above. The functions of determining module 1602 described above may, in certain embodiments, be performed in one or more distinct modules.

Communication module 1604 may perform the transmission functions of wireless device 110. For example, communication module 1604 may communicate any one or more of the messages shown in FIGS. 6-12 as being sent by wireless device 110. Communication module 1604 may include a transmitter and/or a transceiver, such as transceiver 112 described above in relation to FIG. 4. Communication module 1604 may include circuitry configured to wirelessly transmit messages and/or signals. In particular embodiments, communication module 1604 may receive messages and/or signals for transmission from determining module 1602. In certain embodiments, the functions of communication module 1604 described above may be performed in one or more distinct modules.

Receiving module 1606 may perform the receiving functions of wireless device 110. For example, receiving module 1606 may receive any one or more of the messages shown in FIGS. 6-12 as being received by wireless device 110. Receiving module 1606 may include a receiver and/or a transceiver, such as transceiver 112 described above in relation to FIG. 4. Receiving module 1606 may include circuitry configured to wirelessly receive messages and/or signals. In particular embodiments, receiving module 1606 may communicate received messages and/or signals to determining module 1602. The functions of receiving module 1606 described above may, in certain embodiments, be performed in one or more distinct modules.

In certain embodiments, wireless device 110 may optionally include a user input module 1608 that may receive user input intended for wireless device 110. For example, user input module 1608 may receive key presses, button presses, touches, swipes, audio signals, video signals, and/or any other appropriate signals. The input module may include one or more keys, buttons, levers, switches, touchscreens, microphones, and/or cameras. User input module 1608 may communicate received signals to determining module 1602. The functions of user input module 1608 described above may, in certain embodiments, be performed in one or more distinct modules.

In certain embodiments, wireless device 110 may optionally include display module 1610, which may present signals on a display of wireless device 110. Display module 1610 may include the display and/or any appropriate circuitry and hardware configured to present signals on the display. Display module 1610 may receive signals to present on the display from determining module 1602. The functions of display module 1610 described above may, in certain embodiments, be performed in one or more distinct modules.

Determining module 1602, communication module 1604, receiving module 1606, input module 1608, and display module 1610 may include any suitable configuration of hardware and/or software. Wireless device 110 may include additional modules beyond those shown in FIG. 16 that may be responsible for providing any suitable functionality, including any of the functionality described above and/or any additional functionality (including any functionality necessary to support the various solutions described herein).

In certain embodiments, some or all of the modules shown in FIG. 16 can be combined with one or more modules shown in FIG. 14. As an example, certain embodiments may combine at least some of the functionality of input/output module 1406 with at least some of the functionality of communication module 1604 and/or receiving module 1606.

The following provide additional examples of embodiments of methods in a network node and a wireless device, as well as example embodiments of a network node and a wireless device.

Example Method in a Network Node 1-1. A method in a network node (120) comprises:
sending a mapping to a wireless device (110) that is in idle mode, wherein the mapping maps a quasi co-location assumption to a multicast transmission.

1-2. The method of example embodiment 1-1, wherein the mapping is sent in broadcast control information.

1-3. The method of example embodiment 1-1, wherein the mapping is sent in a Master Information Block (MIB) and/or a System Information Block (SIB).

1-4. The method of example embodiment 1-1, wherein the wireless device is in RRC idle mode.

1-5. The method of example embodiment 1-1, wherein the multicast transmission is associated with a temporary multicast group indicator (TMGI) and the mapping maps the quasi co-location assumption to the temporary multicast group indicator.

1-6. The method of example embodiment 1-1, wherein the multicast transmission is associated with a Multimedia Broadcast/Multicast Service (MBMS) bearer and the mapping maps the quasi co-location assumption to the MBMS bearer.

1-7. The method of example embodiment 1-1, wherein the quasi co-location assumption indicates whether the wireless device should assume fully collocated behavior or a flexible quasi co-location configuration.

1-8. The method of example embodiment 1-1, further comprising generating, by the network node, the mapping between the quasi co-location assumption and the multicast transmission.

1-9. The method of example embodiment 1-1, further comprising sending an indicator to the wireless device that indicates whether the network node supports receiving a request to override the mapping of the QCL assumption to the multicast transmission. E.g., the indicator may indicate whether the network node supports receiving a request to override a configuration comprising TM and QCL assumptions.

1-10. The method of example embodiment 1-1 or 1-9, further comprising receiving a request to override the mapping from the wireless device; and sending the wireless device an alternative mapping.

1-11. The method of example embodiment 1-10, wherein the request to override the mapping indicates a QCL assumption supported by the wireless device and the alternative mapping maps the QCL assumption supported by the wireless device.

1-12. The method of example embodiment 1-10 or 1-11, wherein the request to override the mapping indicates a transmission mode supported by the wireless device and the alternative mapping maps the transmission mode supported by the wireless device.

1-13. The method of example embodiment 1-1 or 1-9, further comprising receiving a request to override the mapping from the wireless device; and configuring a unicast bearer for the wireless device.

1-14. The method of example embodiment 1-1, further comprising: determining that a number of wireless devices are not capable of supporting the mapping; generating an alternative mapping comprising a second quasi co-location assumption and a second multicast transmission; and broadcasting the alternative mapping.

1-15. The method of example embodiment 1-1, further comprising: determining to reconfigure the QCL assumption for the wireless device; requesting the wireless device to transition from idle mode to connected mode; and reconfiguring the QCL assumption while the wireless device is in connected mode. E.g., the method may reconfigure a configuration comprising TM and QCL assumptions.

1-16. The method of example embodiment 1-15, wherein the determination to reconfigure the QCL assumption for the wireless device is in response to decision to obtain HARQ feedback, CSI, and/or other measurements from the wireless device.

1-17. The method of example embodiment 1-15, wherein the previous mapping of the quasi co-location assumption to the multicast transmission (i.e., the mapping sent in example embodiment 1-1) is sent via broadcast or multicast control information and the reconfigured QCL assumption overrides the previous mapping with respect to the wireless device.

1-18. The method of example embodiment 1-17, wherein the QCL assumption is not reconfigured for other wireless devices that remain in idle mode (e.g., other wireless devices continue to receive the mapping that maps the quasi co-location assumption to the multicast transmission from example embodiment 1-1 via broadcast or multicast control information).

1-19. The method of example embodiment 1-15, wherein requesting the wireless device to transition from idle mode to connected mode comprises an explicit request to transition to connected mode.

1-20. The method of example embodiment 1-15, wherein requesting the wireless device to transition from idle mode to connected mode comprises an implicit request to transition to connected mode.

1-21. The method of example embodiment 1-20, wherein the implicit request comprises an indication that the network node has decided to obtain HARQ feedback, CSI, and/or other measurements from the wireless device.

Example Method in a Wireless Device 2-1. A method in a wireless device (110) comprises:
receiving, while in idle mode, a mapping that maps a quasi co-location assumption to a multicast transmission.

2-1(a). The method of example embodiment 2-1, further comprising configuring a receiver of the wireless device according to the received mapping.

2-1(b). The method of example embodiment 2-1, further comprising not configuring the receiver of the wireless device according to the received mapping in response to a determination that the wireless device does not support the mapping.

2-2. The method of example embodiment 2-1, wherein the mapping is received in broadcast control information from a network node (120).

2-3. The method of example embodiment 2-1, wherein the mapping is received in a Master Information Block (MIB) and/or a System Information Block (SIB) from a network node.

2-4. The method of example embodiment 2-1, wherein the wireless device is in RRC idle mode.

2-5. The method of example embodiment 2-1, wherein the multicast transmission is associated with a temporary multicast group indicator (TMGI) and the mapping maps the quasi co-location assumption to the temporary multicast group indicator.

2-6. The method of example embodiment 2-1, wherein the multicast transmission is associated with a Multimedia Broadcast/Multicast Service (MBMS) bearer and the mapping maps the quasi co-location assumption to the MBMS bearer.

2-7. The method of example embodiment 2-1, wherein the quasi co-location assumption indicates whether the wireless device should assume fully collocated behavior or a flexible quasi co-location configuration.

2-8. The method of example embodiment 2-1, wherein configuring the receiver according to the received mapping is performed in response to a determination to use a TMGI associated with the multicast transmission indicated by the mapping.

2-9. The method of example embodiment 2-1, further comprising receiving an indicator that indicates whether the network node supports receiving a request to override the mapping of the QCL assumption to the multicast transmission. E.g., the indicator may indicate whether the network node supports receiving a request to override a configuration comprising TM and QCL assumptions.

2-10. The method of example embodiment 2-1 or 2-9, further comprising sending the network node a request to override the mapping; and receiving an alternative mapping from the network node.

2-11. The method of example embodiment 2-10, wherein the request to override the mapping indicates a QCL assumption supported by the wireless device and the alternative mapping maps the QCL assumption supported by the wireless device.

2-12. The method of example embodiment 2-10 or 2-11, wherein the request to override the mapping indicates a transmission mode supported by the wireless device and the alternative mapping maps the transmission mode supported by the wireless device.

2-13. The method of example embodiment 2-1 or 2-9, further comprising sending a request to override the mapping to the network node; and receiving a unicast bearer configuration from the network node.

2-14. The method of example embodiment 2-1, further comprising: receiving an alternative mapping from the network node, the alternative mapping comprising a second quasi co-location assumption and a second multicast transmission; and configuring the receiver of the wireless device according to the received alternative mapping.

2-15. The method of example embodiment 2-1, further comprising: receiving a request to transition from idle mode to connected mode; and receiving a reconfiguration of the QCL assumption while the wireless device is in connected mode.

2-16. The method of example embodiment 2-15, further comprising: receiving a request to provide HARQ feedback, CSI, and/or other measurements to the network node.

2-17. The method of example embodiment 2-15, wherein the previous mapping of the quasi co-location assumption to the multicast transmission (i.e., the mapping sent in example embodiment 2-1) is received via broadcast or multicast control information and the reconfigured QCL assumption overrides the previous mapping with respect to the wireless device. E.g., the method may reconfigure a configuration comprising TM and QCL assumptions.

2-18. The method of example embodiment 2-15, 2-16, or 2-17, further comprising configuring the receiver of the wireless device according to the received reconfiguration of the QCL assumption.

2-19. The method of example embodiment 2-15, wherein the request to transition from idle mode to connected mode comprises an explicit request to transition to connected mode.

2-20. The method of example embodiment 2-15, wherein the request to transition from idle mode to connected mode comprises an implicit request to transition to connected mode.

2-21. The method of example embodiment 2-20, wherein the implicit request comprises an indication that the network node has decided to obtain HARQ feedback, CSI, and/or other measurements from the wireless device.

Example Network Node 3-1. A network node (120) comprising memory and one or more processors, the network node operable to:

send a mapping to a wireless device (110) that is in idle mode, wherein the mapping maps a quasi co-location assumption to a multicast transmission.

3-2. The network node of example embodiment 3-1, wherein the network node sends the mapping in broadcast control information.

3-3. The network node of example embodiment 3-1, wherein the network node sends the mapping in a Master Information Block (MIB) and/or a System Information Block (SIB).

3-4. The network node of example embodiment 3-1, wherein the wireless device is in RRC idle mode.

3-5. The network node of example embodiment 3-1, wherein the multicast transmission is associated with a temporary multicast group indicator (TMGI) and the mapping maps the quasi co-location assumption to the temporary multicast group indicator.

3-6. The network node of example embodiment 3-1, wherein the multicast transmission is associated with a Multimedia Broadcast/Multicast Service (MBMS) bearer and the mapping maps the quasi co-location assumption to the MBMS bearer.

3-7. The network node of example embodiment 3-1, wherein the quasi co-location assumption indicates whether the wireless device should assume fully collocated behavior or a flexible quasi co-location configuration.

3-8. The network node of example embodiment 3-1, the network node further operable to generate the mapping between the quasi co-location assumption and the multicast transmission.

3-9. The network node of example embodiment 3-1, the network node further operable to send an indicator to the wireless device that indicates whether the network node supports receiving a request to override the mapping of the QCL assumption to the multicast transmission. E.g., the indicator may indicate whether the network node supports receiving a request to override a configuration comprising TM and QCL assumptions.

3-10. The network node of example embodiment 3-1 or 3-9, the network node further operable to receive a request to override the mapping from the wireless device; and send the wireless device an alternative mapping.

3-11. The network node of example embodiment 3-10, wherein the request to override the mapping indicates a QCL assumption supported by the wireless device and the alternative mapping maps the QCL assumption supported by the wireless device.

3-12. The network node of example embodiment 3-10 or 3-11, wherein the request to override the mapping indicates a transmission mode supported by the wireless device and the alternative mapping maps the transmission mode supported by the wireless device.

3-13. The network node of example embodiment 3-1 or 3-9, the network node further operable to receive a request to override the mapping from the wireless device; and configure a unicast bearer for the wireless device.

3-14. The network node of example embodiment 3-1, the network node further operable to determine that a number of wireless devices are not capable of supporting the mapping; generate an alternative mapping comprising a second quasi co-location assumption and a second multicast transmission; and broadcast the alternative mapping.

3-15. The network node of example embodiment 3-1, the network node further operable to determine to reconfigure the QCL assumption for the wireless device; request the wireless device to transition from idle mode to connected mode; and reconfigure the QCL assumption while the wireless device is in connected mode. E.g., the network node may reconfigure a configuration comprising TM and QCL assumptions.

3-16. The network node of example embodiment 3-15, wherein the determination to reconfigure the QCL assumption for the wireless device is in response to decision to obtain HARQ feedback, CSI, and/or other measurements from the wireless device.

3-17. The network node of example embodiment 3-15, wherein the network node sends the previous mapping of the quasi co-location assumption to the multicast transmission (i.e., the mapping sent in example embodiment 3-1) via broadcast or multicast control information and the reconfigured QCL assumption overrides the previous mapping with respect to the wireless device.

3-18. The network node of example embodiment 3-17, wherein the network node does not reconfigure the QCL assumption for other wireless devices that remain in idle mode (e.g., other wireless devices continue to receive the mapping that maps the quasi co-location assumption to the multicast transmission from example embodiment 3-1 via broadcast or multicast control information).

3-19. The network node of example embodiment 3-15, wherein the request to transition from idle mode to connected mode comprises an explicit request to transition to connected mode.

3-20. The network node of example embodiment 3-15, wherein the request to transition from idle mode to connected mode comprises an implicit request to transition to connected mode.

3-21. The network node of example embodiment 3-20, wherein the implicit request comprises an indication that the network node has decided to obtain HARQ feedback, CSI, and/or other measurements from the wireless device.

Example Wireless Device 4-1. A wireless device (110) comprising memory and one or more processors, the wireless device operable to:

receive, while in idle mode, a mapping that maps a quasi co-location assumption to a multicast transmission.

4-1(a). The method of example embodiment 4-1, further comprising configuring a receiver of the wireless device according to the received mapping.

4-1(b). The method of example embodiment 4-1, further comprising not configuring the receiver of the wireless device according to the received mapping in response to a determination that the wireless device does not support the mapping.

4-2. The wireless device of example embodiment 4-1, wherein the mapping is received in broadcast control information from a network node (120).

4-3. The wireless device of example embodiment 4-1, wherein the mapping is received in a Master Information Block (MIB) and/or a System Information Block (SIB) from a network node.

4-4. The wireless device of example embodiment 4-1, wherein the wireless device is in RRC idle mode.

4-5. The wireless device of example embodiment 4-1, wherein the multicast transmission is associated with a temporary multicast group indicator (TMGI) and the mapping maps the quasi co-location assumption to the temporary multicast group indicator.

4-6. The wireless device of example embodiment 4-1, wherein the multicast transmission is associated with a Multimedia Broadcast/Multicast Service (MBMS) bearer and the mapping maps the quasi co-location assumption to the MBMS bearer.

4-7. The wireless device of example embodiment 4-1, wherein the quasi co-location assumption indicates whether the wireless device should assume fully collocated behavior or a flexible quasi co-location configuration.

4-8. The wireless device of example embodiment 4-1, wherein the wireless device configures the receiver according to the received mapping in response to a determination to use a TMGI associated with the multicast transmission indicated by the mapping.

4-9. The wireless device of example embodiment 4-1, the wireless device further operable to receive an indicator that indicates whether the network node supports receiving a request to override the mapping of the QCL assumption to the multicast transmission. E.g., the indicator may indicate whether the network node supports receiving a request to override a configuration comprising TM and QCL assumptions.

4-10. The wireless device of example embodiment 4-1 or 4-9, the wireless device further operable to send the network node a request to override the mapping; and receive an alternative mapping from the network node.

4-11. The wireless device of example embodiment 4-10, wherein the request to override the mapping indicates a QCL assumption supported by the wireless device and the alternative mapping maps the QCL assumption supported by the wireless device.

4-12. The wireless device of example embodiment 4-10 or 4-11, wherein the request to override the mapping indicates a transmission mode supported by the wireless device and the alternative mapping maps the transmission mode supported by the wireless device.

4-13. The wireless device of example embodiment 4-1 or 4-9, the wireless device further operable to send a request to override the mapping to the network node; and receive a unicast bearer configuration from the network node.

4-14. The wireless device of example embodiment 4-1, further operable to receive an alternative mapping from the network node, the alternative mapping comprising a second quasi co-location assumption and a second multicast transmission; and configure the receiver of the wireless device according to the received alternative mapping.

4-15. The wireless device of example embodiment 4-1, the wireless device further operable to receive a request to transition from idle mode to connected mode; and receive a reconfiguration of the QCL assumption while the wireless device is in connected mode. E.g., the wireless device may reconfigure a configuration comprising TM and QCL assumptions.

4-16. The wireless device of example embodiment 4-15, the wireless device further operable to receive a request to provide HARQ feedback, CSI, and/or other measurements to the network node.

4-17. The wireless device of example embodiment 4-15, wherein the previous mapping of the quasi co-location assumption to the multicast transmission (i.e., the mapping sent in example embodiment 4-1) is received via broadcast or multicast control information and the reconfigured QCL assumption overrides the previous mapping with respect to the wireless device.

4-18. The wireless device of example embodiment 4-15, 4-16, or 4-17, the wireless device further operable to configure the receiver of the wireless device according to the received reconfiguration of the QCL assumption.

4-19. The wireless device of example embodiment 4-15, wherein the request to transition from idle mode to connected mode comprises an explicit request to transition to connected mode.

4-20. The wireless device of example embodiment 4-15, wherein the request to transition from idle mode to connected mode comprises an implicit request to transition to connected mode.

4-21. The wireless device of example embodiment 4-20, wherein the implicit request comprises an indication that the network node has decided to obtain HARQ feedback, CSI, and/or other measurements from the wireless device.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Certain of the following abbreviations may be used herein:

3 GPP Third Generation Partnership Project
ACK Acknowledgement

AS Application Server
BM-SC Broadcast Multicast-Service Centre
CC Component Carrier
CQI Channel Quality Information
CRC Cyclic Redundancy Check
C-RNTI Cell Radio Network Temporary Identifier
CSI Channel State Information
CSI-RS Channel State Information-Reference Signals
D2D device-to-device
DAI Downlink Assignment Index
DCI Downlink Control Information
DL Downlink
DMRS Demodulation Reference Signals
ECGI E-UTRAN Cell Global Identifier
eNB Evolved NodeB
ePDCCH Enhanced Physical Downlink Control Channel
FDD Frequency Division Duplex
GCS Group Communication System
GCSE Group Communication Service Enabler
GW Gateway
HARQ Hybrid Automated Repeat Request
H-PLMN Home-Public Land Mobile Network
LTE Long Term Evolution
MBMS Multimedia Broadcast/Multicast Service
MBSFN MBMS Single-Frequency Network
MCH Multicast Channel
MCCH Multicast Control Channel
MCPTT Mission Critical Push To Talk
MIB Master Information Block
MTCH Multicast Traffic Channel
NACK Non-Acknowledgement
NW Network
PDCCH Physical Downlink Control Channel
PDSCH Physical Downlink Shared Channel
P-GW Packet Gateway
PHICH Physical Hybrid-ARQ Indicator Channel
PQI Quasi co-location Indicator
ProSe Proximity-based Services
PUCCH Physical Uplink Control Channel
PUSCH Physical Uplink Shared Channel
QCL Quasi Co-Location
RE Resource Element
RRC Radio Resource Control
SC-PTM Single-Cell Point to Multipoint
SIB System Information Block
SR Scheduling Request
TDD Time Division Duplex
TM Transmission Mode
TMGI Temporary Mobile Group Identity
TPC Transmit Power Control
UE User Equipment
UL Uplink
USD User Service Description
V2I Vehicle-to-Infrastructure
V2P Vehicle-to-Pedestrian
V2V Vehicle-to-Vehicle
V2X Vehicle-to-X

The invention claimed is:

1. A method for use in a network node, the method comprising:
sending a control information message to at least one wireless device that is in idle mode, the message comprising a mapping that maps a quasi co-location (QCL) assumption to a multicast transmission or multicast channel, wherein the multicast transmission or multicast channel is associated with a temporary multicast group indicator (TMGI) and the mapping maps the QCL assumption to the TMGI.

2. The method of claim 1, wherein the control information message further comprises information regarding which transmission mode (TM) a receiver of the wireless device should assume for the multicast transmission or multicast channel associated with the TMGI.

3. The method of claim 1, further comprising:
receiving signaling from the wireless device indicating that the wireless device is unable to receive the TMGI; and
determining a way of delivering content to the wireless device other than using the TMGI that the wireless device is unable to receive.

4. The method of claim 3, wherein the way of delivering the content comprises configuring a unicast bearer for serving the wireless device.

5. The method of claim 3, wherein the way of delivering the content comprises reconfiguring the multicast transmission or multicast channel associated with the TMGI such that the multicast transmission or multicast channel configuration is supported by the wireless device.

6. The method of claim 1, further comprising:
determining to reconfigure the QCL assumption of the multicast transmission or multicast channel associated with the TMGI at least with respect to the wireless device;
communicating an indication that the wireless device receiving the multicast transmission or multicast channel associated with a TMGI of interest should transition from idle mode to connected mode; and
reconfiguring the QCL assumption while the wireless device is in connected mode such that, with respect to the wireless device, the reconfigured QCL assumption overrides the previous QCL assumption.

7. The method of claim 6, wherein the QCL assumption is not reconfigured for other wireless devices that remain in idle mode.

8. The method of claim 6, wherein the indication that the wireless device should transition from idle mode to connected mode is communicated as an explicit request to transition to connected mode.

9. The method of claim 6, wherein the indication that the wireless device should transition from idle mode to connected mode is communicated implicitly by requesting to obtain Hybrid Automatic Repeat Request (HARQ) feedback, Channel State Information (CSI), and/or other measurements that the wireless device is configured to communicate while in connected mode.

10. The method of claim 1, wherein the multicast transmission or multicast channel is associated with a Multimedia Broadcast/Multicast Service (MBMS) bearer and the mapping maps the QCL assumption to the MBMS bearer.

11. The method of claim 1, wherein the method further comprises generating the mapping prior to sending the mapping to the wireless device.

12. The method of claim 1, wherein the control information message is sent in a Master Information Block (MIB) and/or a System Information Block (SIB).

13. The method of claim 1, wherein the QCL assumption indicates whether the wireless device should assume fully collocated behavior or a flexible quasi co-location configuration.

14. The method of claim 1, wherein the QCL assumption comprises a default QCL configuration to be used by the wireless devices when receiving the multicast transmission or multicast channel.

15. The method of claim 1, wherein sending the control information message causes the at least one wireless device to use the QCL assumption to decode the multicast transmission or multicast channel while in idle mode.

16. A method for use in a wireless device, the method comprising:
receiving, from a network node, a control information message comprising a mapping that maps a quasi co-location (QCL) assumption to a multicast transmission or multicast channel, the mapping received while in idle mode; and
using the received QCL assumption to decode the multicast transmission or multicast channel while in idle mode if the wireless device supports the mapping wherein the multicast transmission or multicast channel is associated with a temporary multicast group indicator (TMGI) and the mapping maps the QCL assumption to the TMGI.

17. The method of claim 16, wherein the control information message further comprises information regarding which transmission mode (TM) a receiver of the wireless device should assume for the multicast transmission or multicast channel associated with the TMGI.

18. The method of claim 16, further comprising:
determining that the wireless device is unable to receive the multicast transmission or multicast channel associated with the TMGI, the determining based on comparing the QCL assumption associated with the TMGI to capabilities of the wireless device;
sending, to the network node, signaling indicating that the wireless device is unable to receive the multicast transmission or multicast channel associated with a TMGI of interest; and
receiving content from the network node according to a technique that does not require the use of the TMGI that the wireless device is unable to receive.

19. The method of claim 18, wherein the content is received via a unicast bearer that the network node configures for the wireless device.

20. The method of claim 18, wherein the multicast transmission or multicast channel associated with the TMGI is reconfigured to use a configuration that is supported by the wireless device and the content is received via the reconfigured multicast transmission or multicast channel.

21. The method of claim 16, further comprising:
receiving an indication to transition from idle mode to connected mode;
receiving a reconfigured QCL assumption associated with the TMGI while in connected mode; and
overriding the previous QCL assumption with the reconfigured QCL assumption.

22. The method of claim 21, wherein the indication to transition from idle mode to connected mode comprises an explicit request to transition to connected mode.

23. The method of claim 21, wherein the indication to transition from idle mode to connected mode is implicit based on receiving a request to obtain Hybrid Automatic Repeat Request (HARQ) feedback, Channel State Information (CSI), and/or other measurements that the wireless device is configured to communicate while in connected mode.

24. The method of claim 16, wherein the multicast transmission or multicast channel is associated with a Multimedia Broadcast/Multicast Service (MBMS) bearer and the mapping maps the QCL assumption to the MBMS bearer.

25. The method of claim 16, wherein the control information message is sent in a Master Information Block (MIB) and/or a System Information Block (SIB).

26. The method of claim 16, wherein the QCL assumption indicates whether the wireless device should assume fully collocated behavior or a flexible quasi co-location configuration.

27. The method of claim 16, further comprising not configuring the receiver of the wireless device according to the received mapping in response to a determination that the wireless device does not support the mapping.

28. The method of claim 16, further comprising configuring the receiver according to the received mapping in response to a determination to use a TMGI associated with the multicast transmission or multicast channel indicated by the mapping.

29. The method of claim 16, wherein the QCL assumption comprises a default QCL configuration to be used by the wireless devices when receiving the multicast transmission or multicast channel.

30. A network node comprising memory operable to store instructions and processing circuitry operable to execute the instructions, whereby the network node is operable to:
send a control information message to at least one wireless device that is in idle mode, the message comprising a mapping that maps a quasi co-location (QCL) assumption to a multicast transmission or multicast channel, wherein the multicast transmission or multicast channel is associated with a temporary multicast group indicator (TMGI) and the mapping maps the QCL assumption to the TMGI.

31. A wireless device comprising memory operable to store instructions and processing circuitry operable to execute the instructions, whereby the wireless device is operable to:
receive, from a network node, a control information message comprising a mapping that maps a quasi co-location (QCL) assumption to a multicast transmission or multicast channel, the mapping received while in idle mode; and
use the received QCL assumption to decode the multicast transmission or multicast channel while in idle mode if the wireless device supports the mapping wherein the multicast transmission or multicast channel is associated with a temporary multicast group indicator (TMGI) and the mapping maps the QCL assumption to the TMGI.

* * * * *